(12) United States Patent
Naisby et al.

(10) Patent No.: US 10,611,890 B2
(45) Date of Patent: Apr. 7, 2020

(54) METHOD OF PRODUCING A POLYMER PART AND POLYMER PART

(71) Applicant: STRATEC CONSUMABLES GmbH, Anif/Salzburg (AT)

(72) Inventors: Andrew Naisby, Salzburg (AT); Werner Balika, Salzburg (AT); Johann Hofer, Salzburg (AT); Georg Bauer, Salzburg (AT)

(73) Assignee: STRATEC CONSUMABLES GmbH, Anif/Salzburg (AT)

( * ) Notice: Subject to any disclaimer, the term of this patent is extended or adjusted under 35 U.S.C. 154(b) by 0 days.

(21) Appl. No.: 15/238,457

(22) Filed: Aug. 16, 2016

(65) Prior Publication Data

US 2017/0029587 A1   Feb. 2, 2017

Related U.S. Application Data

(62) Division of application No. 14/253,225, filed on Apr. 15, 2014.

(30) Foreign Application Priority Data

Apr. 16, 2013   (EP) .................................. 13164010

(51) Int. Cl.
  *C08J 7/00*   (2006.01)
  *C08J 7/06*   (2006.01)
  (Continued)

(52) U.S. Cl.
  CPC ............... *C08J 7/06* (2013.01); *B05D 3/007* (2013.01); *B05D 3/145* (2013.01); *B05D 5/00* (2013.01);
  (Continued)

(58) Field of Classification Search
  CPC .... H01J 49/00; B05D 5/00; B05D 7/00; C08J 2323/00; C08J 7/00
  See application file for complete search history.

(56) References Cited

U.S. PATENT DOCUMENTS 3,998,772 A * 12/1976 Beerbower ................ C08J 3/07
                                                              516/75
4,935,166 A *  6/1990 Lee et al.
(Continued)

FOREIGN PATENT DOCUMENTS

GB   2 312 782 A   11/1997
GB   2 325 002 A   11/1998
(Continued)

OTHER PUBLICATIONS

Hojun Lee et al., "Functionalizing polymer surfaces by surface migration of copolymer additives: role of additive molecular weight", Polymer, vol. 43, No. 9, XP004339238, (Apr. 1, 2002), pp. 2721-2728.

(Continued)

*Primary Examiner* — David P Turocy
*Assistant Examiner* — Mohammad Mayy
(74) *Attorney, Agent, or Firm* — 24IP Law Group USA, PLLC; Timothy DeWitt

(57) ABSTRACT

A method of producing a polymer part comprising the following steps: (a) incorporating a hydrophobic small molecule into the polymer before, during or after manufacture of the polymer part, the hydrophobic small molecule and the polymer being essentially inert to one another; and (b) annealing the polymer part to induce migration of the hydrophobic small molecules to a surface of the polymer part to provide that surface with a specified degree of hydrophobicity defined by the combination of the polymer (Continued)

and the hydrophobic small molecule; is described. Polymer parts made according to the method are also described.

13 Claims, 22 Drawing Sheets

(51) Int. Cl.
| | |
|---|---|
| B05D 5/00 | (2006.01) |
| B05D 7/02 | (2006.01) |
| C08F 132/00 | (2006.01) |
| C08F 110/06 | (2006.01) |
| B29C 71/02 | (2006.01) |
| H01J 49/04 | (2006.01) |
| B05D 3/00 | (2006.01) |
| B05D 3/14 | (2006.01) |
| C08L 23/12 | (2006.01) |
| C08L 45/00 | (2006.01) |

(52) U.S. Cl.
CPC .............. *B05D 7/02* (2013.01); *C08F 110/06* (2013.01); *C08F 132/00* (2013.01); *C08J 7/08* (2013.01); *C08L 23/12* (2013.01); *C08L 45/00* (2013.01); *H01J 49/0418* (2013.01); *C08J 2323/12* (2013.01); *C08J 2345/00* (2013.01)

(56) References Cited

U.S. PATENT DOCUMENTS

| | | | | |
|---|---|---|---|---|
| 5,346,518 | A | * | 9/1994 | Baseman ................. B65G 1/00 206/204 |
| 5,603,983 | A | * | 2/1997 | Clough ............. C04B 35/62847 427/126.3 |
| 5,828,063 | A | | 10/1998 | Koester et al. |
| 6,153,701 | A | | 11/2000 | Potnis et al. |
| 6,414,306 | B1 | | 7/2002 | Mayer-Posner et al. |
| 6,423,966 | B2 | | 7/2002 | Hillenkamp et al. |
| 6,670,609 | B2 | | 12/2003 | Franzen et al. |
| 6,787,764 | B2 | | 9/2004 | Park |
| 6,825,465 | B2 | | 11/2004 | Schuerenberg et al. |
| 7,232,688 | B2 | | 6/2007 | Little et al. |
| 7,399,640 | B2 | | 7/2008 | Schuerenberg et al. |
| 2002/0094533 | A1 | * | 7/2002 | Hess ..................... B01J 19/0046 435/6.14 |
| 2005/0072917 | A1 | | 4/2005 | Becker |
| 2006/0135673 | A1 | * | 6/2006 | Temperante ............. C08K 5/10 524/463 |
| 2006/0284743 | A1 | * | 12/2006 | Lung et al. ......... H01L 21/8244 |
| 2007/0065588 | A1 | * | 3/2007 | Kihara ................... G11B 5/855 427/355 |
| 2007/0267030 | A1 | | 11/2007 | Muratoglu et al. |
| 2008/0139689 | A1 | | 6/2008 | Huang et al. |
| 2008/0226995 | A1 | * | 9/2008 | Costanzo et al. ........ C08L 87/00 |
| 2009/0260848 | A1 | | 10/2009 | Perera et al. |
| 2010/0082101 | A1 | | 4/2010 | Muratoglu et al. |
| 2010/0237237 | A1 | | 9/2010 | Green et al. |
| 2013/0121892 | A1 | | 5/2013 | Fuhrmann et al. |
| 2013/0197120 | A1 | | 8/2013 | Muratoglu et al. |

FOREIGN PATENT DOCUMENTS

| | | |
|---|---|---|
| GB | 2 332 273 A | 6/1999 |
| WO | WO 94/03544 | 2/1994 |
| WO | WO 02/055199 A2 | 7/2002 |
| WO | WO 2005/005199 A2 | 1/2005 |
| WO | WO 2005/033663 A2 | 4/2005 |
| WO | WO 2007/024684 A2 | 3/2007 |
| WO | WO 2012/013361 A2 | 2/2012 |

OTHER PUBLICATIONS

Daniel P. Sanders, et al., "Self-segregating materials for immersion lithography", Advances in Resist Materials and Processing Technology XXV, vol. 6923, article id. 692309, 2008, 2 pages (Submitting Abstract Only).

Kazuo Sugiyama, et al., "Generation of non-equilibrium plasma at atmospheric pressure and application for chemical process", Thin Solid Films, vol. 316, Issues 1-2, Mar. 1998, 2 pages (Submitting Abstract Only).

Extended European Search Report dated Jul. 18, 2014 in Patent Application No. 14164799.0.

Von K. Rombusch, et al., "Über die Verteilung und Migration von Antistatika in Formstücken aus Polyolefinen und Polystyrol", Die Angewandte Makromolekulare Chemie, vol. 34, No. 1, XP055126584, (Dec. 6, 1973), pp. 55-70.

* cited by examiner

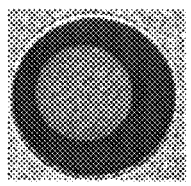 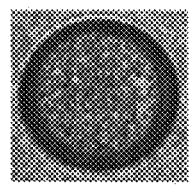 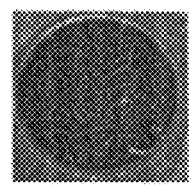 
Fig. 14A　　Fig. 14B　　Fig. 14C　　Fig. 14D
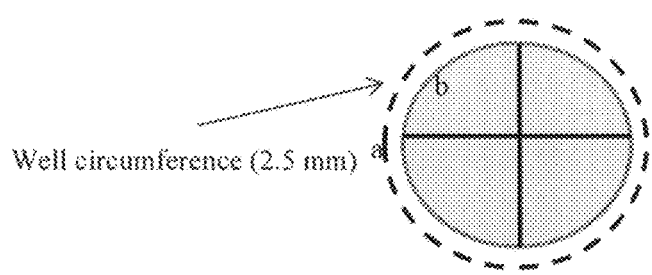
Fig. 15

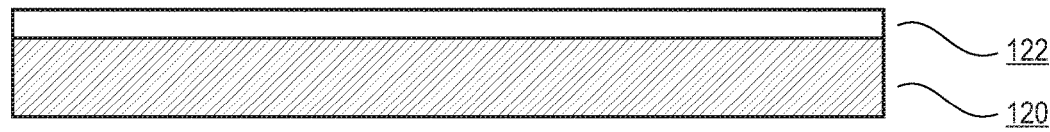
Fig. 18
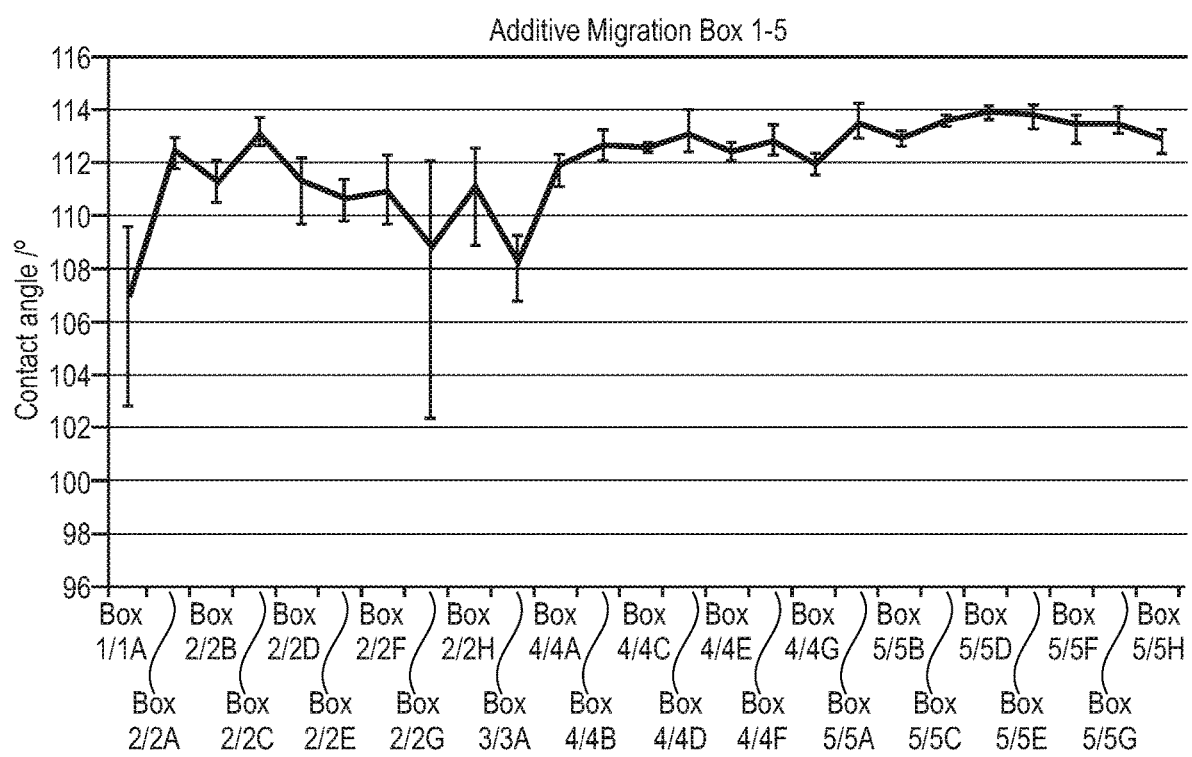

METHOD OF PRODUCING A POLYMER PART AND POLYMER PART

BACKGROUND

Field of the Disclosure

The technology relates to polymer parts as used for microfluidic devices, targets for Matrix Assisted Laser Desorption Ionisation (MALDI) mass spectrometry, and other applications where good control of the wetting properties of at least one surface of a polymer part is needed.

Additives have been used to modify the bulk and surface properties of polymers since the beginning of polymer sciences. For example, softeners are applied to polyvinyl chlorides (PVC) to modify the properties of the brittle base material in applications where flex and elongation before break are needed. In addition, polymers have been modified with additives to protect them against oxidative stress or ultraviolet radiation. Furthermore, some hydrophobic additives have been used to improve the melt-flow properties in order to allow easier processing, preventing a polymer from shear stressed during processing.

In each case, the amount of additives needed was optimized to achieve each of the desired properties and combinations thereof. However, the large amount of additive required (for example, in the PVC compositions referred to above, 30% of the total weight of the composition is additives) can lead to an undesirable result in that such additives accumulate after a certain time of storage at the surface on the injection moulded or extruded article, potentially making such compounds or compositions unstable.

Description of the Related Art

One particular application of polymers having additives applied thereto is for MALDI mass spectrometry. MALDI is based on incorporating an analyte into a special matrix, usually an organic acid crystal, which permits laser desorption of the analyte in the instrument. The matrix assists the process in two primary ways. Firstly, the open crystal structure of the matrix readily absorbs the analyte and serves to allow the analyte to be spotted onto the surface of a MALDI target where it dries into a solid spot. Secondly, during the laser desorption stage of the analytical process the organic acid matrix ionises the analyte by proton transfer when both are in a vapour phase so that the molecular weight fractions of the analyte can be detected, for example in a time-of-flight mass spectrometer. The matrix can be pre-spotted as a liquid onto the MALDI target, with subsequent deposition of the analyte also as a liquid; or the matrix and analyte may be mixed together and spotted at the same time. The spotted liquid droplets are then allowed to dry and solidify. Once dried, the MALDI target can be arranged in the mass spectrometer and the analyte is released by scanning a laser over each spot in turn to desorb the analyte from the matrix. The laser assumes the spots are centred on precise grid locations on the target and that the spots have a defined diameter. Deviations from this result in poorer performance of the instrument, since, for example, a lesser quantity of analyte may be desorbed. An important part of the design of the top surface of a MALDI target plate is therefore how to ensure that the spots centre correctly on the grid locations during spotting, and remain in position during the subsequent drying process.

MALDI and specifically how to design the MALDI target plates is discussed extensively in the literature. A MALDI target generally takes the form of a rectangular format substrate with a square grid array of spot locations, e.g. 48 in a 6×8 array, 96 in a 12×8 array. The substrates were conventionally made of metal, for example stainless steel. These solid metal targets are re-useable, since they can be cleaned chemically and physically after use. Surface treatments are used to make the spotting surface generally hydrophobic to ensure that when the spots are deposited the liquid has a large contact angle and the spot remains localised where it is deposited during its drying phase. MALDI targets have been developed so that localised hydrophilic areas are arranged at the intended spot locations, so that when the liquid spots are deposited on the spotting surface they are effectively anchored at these hydrophilic points, thereby ensuring that the spot array of dried spots are precisely located at the intended laser sampling points. Local oxidization of the metal spotting surface can for example cause local hydrophilic regions to form in a more hydrophobic general area provided by the metal. Another approach is to define the spotting locations physically, e.g. with shallow wells, in the spotting surface.

In recent years MALDI targets based on polymer substrates have been developed. These are generally single use parts. Polymer substrates can have natively hydrophobic surfaces, or have their surfaces treated by plasma treatment to achieve a desired degree of hydrophobicity. In other designs, the polymer substrates have their spotting surface coated with a suitable material to provide the desired hydrophobicity or combination of hydrophobicity and hydrophilic anchor points. The coating may be a metal coating for example. It is also known to provide a substrate in which the bare surface is hydrophilic and then to selectively coat the bare surface with a hydrophobic material leaving small areas of the bare surface to form the anchor points. For example, it is known to use PTFE coating or coating with organic-inorganic sol gel nanocomposite materials using the coating method described in the literature. Coating of the grid locations is avoided by using a suitable lithographic process, e.g. covering the grid locations with a lacquer or photoresist prior to coating the remainder of the surface, which is then removed after coating to reveal the bare surface at the grid locations.

Moreover, plasma treatment of polymer surfaces is also an established technique for imposing controlled modification of the degree of hydrophobicity of polymer surfaces, and this can be used on its own, or more likely in combination with other techniques during manufacturing to achieve the desired surface hydrophobic/hydrophilic specification for a MALDI target made from a polymer substrate.

The use of hydrophobic small molecules, such as fatty acid or lipid type surface treatments to generate hydrophobicity on the surface of a polymer, is generally known in the art. However, in the techniques of the prior art, these small molecules have been applied to a target surface using a dip coating process from a solvent (methanol) solution. The application of the lipid by such wet coating methods can result in uneven deposition of the lipid. In addition, although a hydrophobic surface can be made using this technique the final contact angle variation within one target may easily vary, therefore rendering any subsequent automated analyte deposition unreliable. The advantages and inherent tight tolerances of an automated process are described in the literature.

Other known techniques for creating hydrophobic surfaces include deposition of PTFE layers or printing hydrophobic organic polymer layers. Although these techniques may impart hydrophobicity in the target's surface, the full extent of their implications with respect to the complete MALDI process has not been considered. For example, organic inks or coatings always contain additives (wetting agents, surfactants, defoamers, stabilisers etc) and residual monomers and such molecules can be regarded as potential contaminants in mass spectrometry. The limitations of PTFE coating and its layer thickness are discussed specifically in the literature.

The migration of polymeric materials and clays from the bulk to the surface of a polymer is known in the art. However, as can be understood from the above, it is generally thought that there is a great degree of control over the surface properties, and many ways to make a surface with the desired hydrophobic and hydrophilic properties. However, although this is true at the point of manufacture, the inventors have conducted long term stability tests on polymer substrates of the type used for MALDI targets and found that the degree of hydrophobicity of the surface slowly changes over time, as measured for example, one month, 3 months, 6 months and 12 months after manufacture. Many of these products should therefore be disposed of if not used soon enough after manufacture, or end up being used when their surface properties no longer meet specification.

SUMMARY

The following are provided:

(1) A method of producing a polymer part comprising the following steps:
(a) incorporating a hydrophobic small molecule into the polymer before, during or after manufacture of the polymer part, the hydrophobic small molecule and the polymer being essentially inert to one another; and
(b) annealing the polymer part to induce migration of the hydrophobic small molecules to a surface of the polymer part to provide that surface with a specified degree of hydrophobicity defined by the combination of the polymer and the hydrophobic small molecule.

(2) A method according to (1), additionally comprising the further step (c) after step (b):
(c) annealing the polymer part to induce migration of the hydrophobic small molecules to a surface of the polymer part to provide the surface of an adjacent part with a specified degree of hydrophobicity by vaporisation onto an adjacent surface defined by the combination of the polymer and the hydrophobic small molecule.

(3) A method according to (1) or (2), wherein the specified degree of hydrophobicity is further defined by a coating layer on said surface.

(4) A method according to (3), wherein said surface has a first surface portion and a second surface portion which differ in their surface coating.

(5) A method according to any one of (1) to (4), wherein the polymer is an organic polymer.

(6) A method according to (5), wherein the organic polymer is a polyolefin.

(7) A method according to (6), wherein the polyolefin is polypropylene, a cycloolefin homopolymer or a cycloolefin copolymer.

(8) A method according to any one of (3) to (7), wherein the hydrophobic small molecule has a functional group capable of forming a chemical bond to a metal atom.

(9) A method according to any one of (1) to (8), wherein the small molecule is incorporated into polymer raw material used to form the polymer part.

(10) A method according to any one of (1) to (9), additionally including the following step subsequent to step (a) but prior to step (b):
(a1) coating said surface of the polymer part with a metal or a metallic compound.

(11) A method according to (10), additionally comprising the step subsequent to step (a1) but prior to step (b):
(a2) oxidising the metal or metallic compound on said surface.

(12) A method according to any one of (1) to (11), additionally including the step of coating said surface of the polymer part with an insulator.

(13) A method according to any one of (10) to (12), additionally comprising the step subsequent to step (a1) but prior to step (b):
(a2) performing a plasma treatment of said surface of the polymer part.

(14) A method according to any of (1) to (13), further comprising: re-annealing the polymer part at a subsequent time to return the surface to the specified degree of hydrophobicity.

(15) A polymer part obtained by the method of any of (1) to (14).

Incorporation of a hydrophobic small molecule into the bulk of a polymer, and subsequent annealing to induce migration of the small molecules within the bulk of the polymer part, according to the present technology, results in a well-defined and long-term stable surface energy on the surface of the polymer part, not only for a bare polymer surface, but also if the polymer part has a surface formed by a layer of a different material, such as a metal or an oxide. The wetting properties, i.e. degree of hydrophobicity as measurable by contact angle for example can thus be well defined over long storage periods.

The hydrophobic small molecules in the bulk of the polymer part appear to act as a reservoir so that over long periods the surface energy remains stable through slow probably thermally-activated migration towards the surfaces of the polymer part. The defined surface energy which is achieved at the end of the annealing process during manufacture is thus maintained over time scales of weeks and months by subsequent slow replenishment from the interior of the polymer part. In short, the small molecules in the polymer make the surface of the polymer part self-stabilising both in the case of a bare polymer surface and a coated polymer surface.

In particular, when the polymer part is coated with a metal (or other material) as described below, it has been found that annealing the polymer part induces migration of the hydrophobic small molecule not only within the bulk of the polymer to a bare polymer surface, but also through a non-polymer layer, such as a metal layer, that coats the polymer. Moreover, when the polymer part is coated, depending on the composition and thickness of the coating layer, the ease of migration of the small molecules through it will vary. It has been found that in the case where migration of the small molecule through a coating layer is relatively slow during annealing conditions, the stabilisation of the surface to the desired surface energy with the small molecules can be assisted by evaporating small molecules onto the surface of the coating layer from an external source. One convenient way of achieving this is to arrange the bare polymer surface of another polymer part made of the same composition adjacent to the coated surface during the annealing.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 14A through 14D illustrate the spot judgment criteria for the MALDI matrix spotting carried out in Example 5;

FIG. 15 illustrates the spot geometry for the MALDI matrix spotting carried out in Example 5;

FIG. 18 is a schematic of the slides used in Example 6;

DETAILED DESCRIPTION OF THE EMBODIMENTS

Polymer

Figure 1:
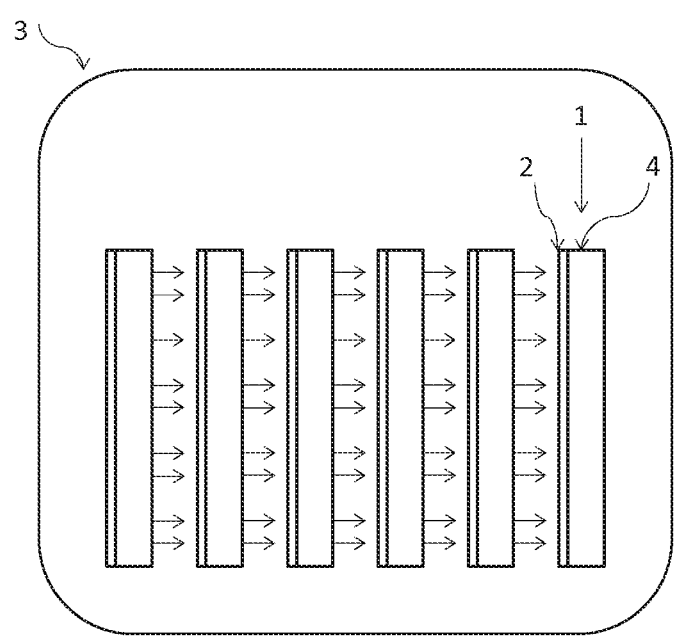
FIG. 1 shows schematically the arrangement used in a convection oven.

In this specification the term 'polymer' is defined as meaning a chemical compound or mixture of compounds consisting of repeating structural units created through a process of polymerization. Polymerization is the process of combining many small molecules known as monomers into a covalently bonded chain or network.

According to the present technology, the polymer has a structure and composition such that, after incorporation into a polymer part, the hydrophobic small molecule is able to migrate from the bulk of the polymer to the surface of the or an adjacent polymer part. There is no particular limitation on the polymer provided its structure and/or composition permits the migration of the hydrophobic small molecule. Typically, the polymer is essentially inert to the hydrophobic small molecule. For example, the polymer should generally not contain functional groups capable of reacting with the hydrophobic small molecule, as any such reaction could impede or prevent the migration of the small molecule from the bulk of the polymer to the surface of the or an adjacent polymer part.

Typically, the structure of the polymer is such so as to facilitate migration of the hydrophobic small molecule from the bulk of the polymer to its surface. In particular, it has been found that migration of the hydrophobic small molecule is particularly facilitated when the polymer is crystalline or semi-crystalline, for example PP. High tacticity will also tend to lead to a less dense polymer matrix and hence tend to provide a better mobility host. On the other hand, dense polymer matrices such as provided by amorphous polymers (such as low density polyethylene or cycloolefin copolymers such as those defined and exemplified below) will generally not allow sufficient small molecule mobility, so are less good candidates as hosts, since they are likely to require higher small molecule concentrations to provide a given hydrophobicity compared with a lower density crystalline or semi-crystalline polymer host.

Suitably, the glass transition temperature ($T_g$) of the polymer is between 50 and 250° C. in some embodiments 80-160° C. This temperature can be measured using DSC, for example with standard test method JIS K7121. Polymers having glass transition temperatures within this range may be particularly suitable for allowing hydrophobic small molecules within their bulk to migrate to their surface.

Suitably, the heat deflection temperature of the polymer, when measured at 1.8 MPa according to ASTM D648/ISO 75 without annealing is 50 to 250° C., in some embodiments 60 to 180° C. Suitably, the heat deflection temperature of the polymer, when measured at 0.45 MPa according to ASTM D648/ISO 75 without annealing is 50 to 250° C., in some embodiments 80 to 200° C. Polymers having heat deflection temperature within this range may be particularly suitable for allowing hydrophobic small molecules within their bulk to migrate to their surface.

Suitably, the percentage by weight of the hydrophobic small polymer in the polymer part does not exceed 20%. If the hydrophobic small molecule migrates well then only a small concentration is needed, e.g. in a range from as little as 0.1, 0.2, 0.3 wt % up to 1, 2, 3, 4, 5, 6, 7, 8, 9 or 10 wt %.

In one embodiment, the polymer is an organic polymer. A large number of organic polymers are known in the art. Examples of particular classes of organic polymers suitable for use according to the present technology include polyolefins, polyesters, polycarbonates, polyamides, polyimides, polyether sulfones, and mixtures or derivatives thereof.

In one embodiment, the organic polymer is a polymer formed by polymerising an ethylenically unsaturated monomer (i.e. a compound having a C═C bond). In one embodiment, the ethylenically unsaturated monomer may be an olefin: in other words, an unsubstituted, unsaturated hydrocarbon (such as ethylene, propylene, 1-butene or styrene). In this specification polymers formed by polymerising such monomers are termed 'polyolefins'. In another embodiment, the ethylenically unsaturated monomer is an ethylenically unsaturated hydrocarbon substituted with a halogen atom (such as vinyl chloride, vinylidene dichloride or tetrafluoroethylene), or an ethylenically unsaturated hydrocarbon substituted with another substituent which, following polymerisation, is inert to the hydrophobic small molecule. In this specification polymers formed by polymerising such monomers are termed 'substituted polyolefins'.

Examples of suitable polyolefins include, but are not limited to: polyethylenes; polypropylenes; poly(l-butene); poly(l-pentene); poly(l-hexene); poly(methyl pentene); polystyrene; cycloolefin polymers and copolymers, such as those described in more detail below; and mixtures thereof. Examples of suitable substituted polyolefins include, but are not limited to: poly(vinyl chloride); poly(vinylidene chloride); poly(vinylidene fluoride); poly(tetrafluoroethylene) (PTFE—Teflon®); poly(methyl methacrylate); and mixtures thereof. In one embodiment, the polyolefin is polyethylene. Examples of suitable polyethylenes include, but are not limited to, low density polyethylene, linear low density polyethylene, high density polyethylene, ultra-high molecular weight polyethylene, and mixtures thereof. All of the above forms of polyethylene can be prepared by standard techniques well known to those skilled in the art.

In one embodiment, the polyolefin is polypropylene. The polypropylene may be stereoregular (isotactic or syndiotactic), atactic polypropylene, or a mixture thereof. Stereoregular polypropylene, as well as other poly(l-alkenes), can be isotactic or syndiotactic depending on the relative orientation of the alkyl groups in the polymer chains. Stereoregular polypropylene chains are illustrated below (isotactic above syndiotactic):

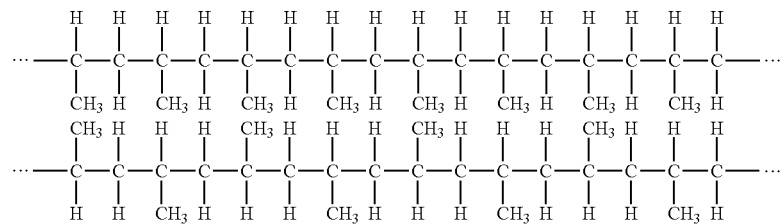

In isotactic polypropylene, all stereogenic centers $CHCH_3$ share the same configuration. The stereogenic centers in syndiotactic polypropylene alternate their relative configuration. A polypropylene that lacks any regular arrangement in the position of its methyl substituents is called atactic. Both isotactic and syndiotactic polypropylene are crystalline, whereas atactic polypropylene is amorphous. All of the above forms of polypropylene can be prepared by standard techniques well known to those skilled in the art. Suitably, the polypropylene is isotactic polypropylene or syndiotactic polypropylene.

In some embodiments, the polyolefin is a cycloolefin homopolymer or copolymer. In this specification the term "cycloolefin homopolymer" means a polymer formed entirely from cycloalkene (cycloolefin) monomers. Typically, the cycloalkene monomers from which the cycloolefin homopolymer is formed have 3 to 14, suitably 4 to 12, in some embodiments 5 to 8, ring carbon atoms. Typically, the cycloalkene monomers from which the cycloolefin homopolymer is formed have 1 to 5, such as 1 to 3, suitably 1 or 2, in some embodiments 1 carbon-carbon double bonds. Typically, the cycloalkene monomers from which the cycloolefin homopolymer is formed have 1 to 5, such as 1 to 3, suitably 1 or 2, in some embodiments 1 carbocyclic ring. The carbocyclic ring may be substituted with one or more, typically 1 to 3, suitably 1 or 2, in some embodiments 1 substituent, the substituent(s) being each independently selected from the group consisting of $C_{1-6}$ alkyl (typically $C_{1-4}$ alkyl, particularly methyl or ethyl), $C_{3-8}$ cycloalkyl (typically $C_{5-7}$ cycloalkyl, especially cyclopentyl or cyclohexyl), phenyl (optionally substituted by 1 to 5 substituents selected from $C_{1-6}$ alkyl, $C_{1-6}$ alkoxy, halo and nitro), or halogen.

The term "cycloolefin copolymer" means a polymer formed from both cycloalkene and non-cyclic alkene (olefin) monomers. The monomers may be hydrocarbons or may have additional functional groups, provided they contain an ethylenically unsaturated (C═C) bond. Typically, the cycloalkene monomers from which the cycloolefin copolymer is formed have 3 to 14, suitably 4 to 12, in some embodiments 5 to 8, ring carbon atoms. Typically, the cycloalkene monomers from which the cycloolefin copolymer is formed have 1 to 5, such as 1 to 3, suitably 1 or 2, in some embodiments 1 carbon-carbon double bonds. Typically, the cycloalkene monomers from which the cycloolefin copolymer is formed have 1 to 3, suitably 1 or 2, in some embodiments 1 carbocyclic ring. The carbocyclic ring may be substituted with one or more, typically 1 to 3, suitably 1 or 2, in some embodiments 1 substituent, the substituent(s) being each independently selected from the group consisting of $C_{1-6}$ alkyl (typically $C_{1-4}$ alkyl, particularly methyl or ethyl), $C_{3-9}$ cycloalkyl, (typically $C_{5-7}$ cycloalkyl, especially cyclopentyl or cyclohexyl), phenyl (optionally substituted by 1 to 5 substituents selected from $C_{1-6}$ alkyl, $C_{1-6}$ alkoxy, halo and nitro), or halogen. Examples of the non-cyclic alkene copolymerised with the cycloolefin include ethylene; propylene; 1-butene; 2-methylpentene; vinyl chloride; vinylidene chloride; vinylidene fluoride; tetrafluoroethylene or styrene; in some embodiments ethylene or propylene, particularly ethylene.

Examples of commercially available cycloolefin homopolymers and copolymers usable in the present disclosure are those based on 8,8,10-trinorborn-2-ene (norbornene; bicyclo[2.2.1]hept-2-ene) or 1,2,3,4,4a,5,8,8a-octahydro-1,4:5,8-dimethanonapthalene (tetracyclododecene) as monomers. As described in Shin et al., Pure Appl. Chem., 2005, 77(5), 801-814, homopolymers of these monomers can be formed by a ring opening metathesis polymerisation: copolymers are formed by chain copolymerisation of the aforementioned monomers with ethylene.

Therefore, in one embodiment, the cycloolefin polymer is a cycloolefin homopolymer of general formula (A):

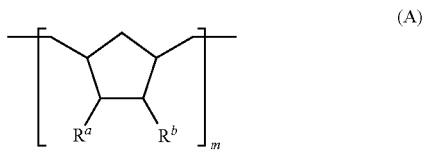

(A)

wherein:
m is such that the average molecular weight ($M_w$) of the polymer ranges from 25,000 to 250,000; and
$R^a$ and $R^b$ are each independently selected from the group consisting of:
hydrogen;
$C_{1-6}$ alkyl (the alkyl group being optionally substituted by 1 to 3 substituents independently selected from $C_{3-8}$ cycloalkyl, $C_{1-6}$ alkoxy, hydroxy, halo, —$NH_2$, —$NH(C_{1-6}$alkyl), —$N(C_{1-6}$alkyl)$_2$, —C(O)OH or —C(=O)$C_{1-6}$ alkyl);
$C_{3-8}$ cycloalkyl (the cycloalkyl group being optionally substituted by 1 to 3 substituents independently selected from $C_{1-9}$ alkyl, $C_{1-6}$ alkoxy, hydroxy, halo, —$NH_2$, —$NH(C_{1-6}$alkyl), —$N(C_{1-6}$ alkyl)$_2$, —C(=O)OH or —C(=O)$C_{1-6}$ alkyl);
phenyl (optionally substituted by 1 to 5 substituents selected from $C_{3-9}$ cycloalkyl, $C_{1-6}$ alkoxy, hydroxy, halo, —$NH_2$, —$NH(C_{1-6}$alkyl), —$N(C_{1-6}$alkyl)$_2$, —C(=O)OH, —C(=O)$C_{1-6}$alkyl and nitro), $C_{1-6}$ alkoxy;
hydroxy;
halo;
—$NH_2$,
—$NH(C_{1-6}$ alkyl),
—$N(C_{1-6}$alkyl)$_2$,
—C(=O)OH; or
—C(=O)$C_{1-6}$ alkyl;
or $R^a$ and $R^b$ together with the carbon atoms to which they are attached form a carbocyclic ring having 4 to 10, suitably 5 to 8, carbon atoms in 1 to 3, suitably 1 or 2, rings, the ring carbon atoms each being optionally substituted by one or more substituents selected from the group consisting of:
$C_{1-6}$ alkyl (the alkyl group being optionally substituted by 1 to 3 substituents independently selected from $C_{3-8}$ cycloalkyl, $C_{1-6}$ alkoxy, hydroxy, halo, —$NH_2$, —NH($C_{1-6}$ alkyl), —$N(C_{1-6}$ alkyl)$_2$, —C(=O)OH or —C(=O)$C_{1-6}$alkyl),
$C_{3-8}$ cycloalkyl (the cycloalkyl group being optionally substituted by 1 to 3 substituents independently selected from $C_{1-8}$ alkyl, $C_{1-6}$ alkoxy, hydroxy, halo, —$NH_2$, —$NH(C_{1-6}$alkyl), —$N(C_{1-6}$alkyl)$_2$, —C(O)OH or —C(=O)$C_{1-6}$ alkyl),
phenyl (optionally substituted by 1 to 5 substituents selected from $C_{3-8}$ cycloalkyl, $C_{1-6}$ alkoxy, hydroxy, halo, —$NH_2$, —$NH(C_{1-6}$ alkyl), —$N(C_{1-6}$ alkyl)$_2$, —C(=O)OH, —C(=O)$C_{1-6}$ alkyl and nitro),
$C_{1-6}$ alkoxy,
hydroxy,
halo,
—$NH_2$,
$NH(C_{1-6}$ alkyl),
—$N(C_{1-6}$ alkyl)$_2$,
—C(O)OH or
—C(=O)$C_{1-6}$ alkyl.

In this specification "alkyl" denotes a straight- or branched-chain, saturated, aliphatic hydrocarbon radical. Said "alkyl" may consist of 1 to 12, typically 1 to 8, in some embodiments 1 to 6 carbon atoms. A $C_{1-6}$ alkyl group includes methyl, ethyl, propyl, isopropyl, butyl, t-butyl, 2-butyl, pentyl, hexyl, and the like. The alkyl group may be substituted where indicated herein.

"Cycloalkyl" denotes a cyclic, saturated, aliphatic hydrocarbon radical. Examples of cycloalkyl groups are moieties having 3 to 10, for example 3 to 8 carbon atoms, including cyclopropyl, cyclobutyl, cyclopentyl, cyclohexyl and cyclooctyl groups. The cycloalkyl group may be substituted where indicated herein.

"Alkoxy" means the radical "alkyl-O—", wherein "alkyl" is as defined above, either in its broadest aspect or a more restricted aspect.

"Phenyl" means the radical —$C_6H_5$. The phenyl group may be substituted where indicated herein.

"Hydroxy" means the radical —OH.

"Thiol" means the radical —SH.

"Halo" means a radical selected from fluoro, chloro, bromo, or iodo.

"Nitro" means the radical —$NO_2$.

"Carboxylic acid" means the radical —$CO_2H$.

"Sulfinic acid" means the radical —$SO_2H$.

"Sulfonic acid" means the radical —$SO_3H$.

"Amino" means the radical —$NR_2$, wherein R is hydrogen or alkyl (as defined above, either in its broadest aspect or a more restricted aspect).

In one embodiment, $R^a$ and $R^b$ are each independently selected from the group consisting of hydrogen, $C_{1-6}$ alkyl, $C_{3-8}$ cycloalkyl or phenyl. In one embodiment, $R^a$ and $R^b$ are each independently selected from the group consisting of hydrogen or $C_{1-6}$ alkyl. In one embodiment, $R^a$ and $R^b$ are both hydrogen.

In an alternative embodiment, $R^a$ and $R^b$ together with the carbon atoms to which they are attached form a ring selected from cyclopentane, cyclohexane, cycloheptane, cyclooctane, bicyclo[2.2.1]heptane or bicyclo[2.2.2]octane, the ring carbon atoms each being optionally substituted by one or more substituents selected from the group consisting of $C_{1-6}$ alkyl (the alkyl group being optionally substituted by 1 to 3 substituents independently selected from $C_{3-8}$ cycloalkyl, $C_{1-6}$ alkoxy, hydroxy, halo, —$NH_2$, —$NH(C_{1-6}$alkyl), —$N(C_{1-6}$alkyl)$_2$, —C(O)OH or —C(=O)$C_{1-6}$alkyl), $C_{3-8}$ cycloalkyl (the cycloalkyl group being optionally substituted by 1 to 3 substituents independently selected from $C_{1-6}$ alkyl, $C_{1-6}$ alkoxy, hydroxy, halo, —$NH_2$, —$NH(C_{1-6}$ alkyl), —$N(C_{1-6}$alkyl)$_2$, —C(=O)OH or —C(=O)$C_{1-6}$alkyl), phenyl (optionally substituted by 1 to 5 substituents selected from $C_{3-8}$ cycloalkyl, $C_{1-6}$ alkoxy, hydroxy, halo, —$NH_2$, —$NH(C_{1-6}$alkyl), —$N(C_{1-6}$alkyl)$_2$, —C(=O)OH, —C(=O)$C_{1-6}$alkyl and nitro), $C_{1-6}$ alkoxy, hydroxy, halo, —$NH_2$, —$NH(C_{1-6}$ alkyl), —$N(C_{1-6}$alkyl)$_2$, —C(O)OH or —C(=O)$C_{1-6}$ alkyl. In this embodiment, suitably $R^a$ and $R^b$ together with the carbon atoms to which they are attached form a ring selected from cyclopentane, cyclohexane, cycloheptane, cyclooctane, bicyclo[2.2.1]heptane or bicyclo [2.2.2]octane, the ring carbon atoms each being optionally substituted by one or more substituents selected from the group consisting of $C_{1-6}$ alkyl, $C_{3-8}$ cycloalkyl or phenyl.

In some embodiments, m is such that the average molecular weight (Mw) of the polymer ranges from 50,000 to 150,000.

In another embodiment, the cycloolefin polymer is a cycloolefin polymer of formula (B):

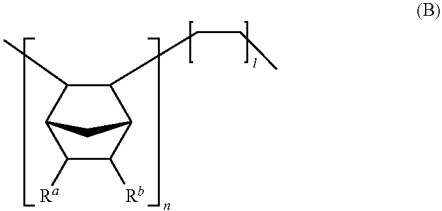

wherein:

n and l are such that the average molecular weight ($M_w$) of the polymer ranges from 25,000 to 250,000;

n is such that the mole fraction of cycloolefin repeating units ranges from 0.2 to 0.7;

l is such that the mole fraction of ethylene repeating units ranges from 0.8 to 0.3; and $R^a$ and $R^b$ are as defined above for formula (A), either in its broadest aspect or a restricted aspect.

Chemical structures of the repeating units of certain specific cycloolefin homopolymers useful in the present technology are shown below.

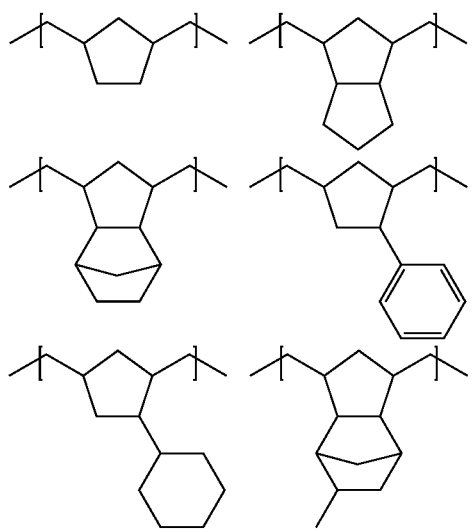

An example of a ring opening metathesis polymerisation scheme for norbornene derivatives, as well as a scheme for their copolymerisation with ethene is shown below.

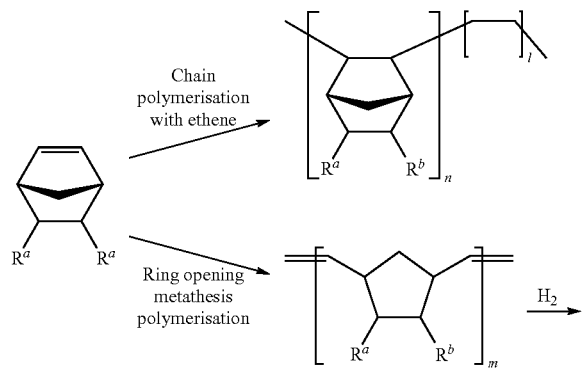

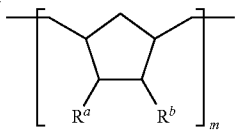

In the above reaction scheme, l, m, n, $R^a$ and $R^b$ are as defined above, either in its broadest aspect or a restricted aspect.

In some embodiments, n and l are such that the average molecular weight ($M_w$) of the polymer ranges from 50,000 to 150,000.

In some embodiments, n is such that the mole fraction of cycloolefin repeating units ranges from 0.3 to 0.6; and l is such that the mole fraction of ethylene repeating units ranges from 0.7 to 0.4.

Examples of suitable polyamides include nylon 6-6, nylon 6-12 and nylon 6. Examples of suitable polyesters include polyethylene terephthalate, polybutylene terephthalate, polytrimethylene terephthalate, polyethylene adipate and polycaprolactone.

When the polymer is an organic polymer (particularly a polyolefin or substituted polyolefin), suitably, the average molecular weight ($M_w$) of the polymer ranges from 25,000 to 1,000,000; in some embodiments 25,000 to 250,000, when measured using size exclusion chromatography (gel permeation chromatography) using monodisperse polystyrene standards (ISO 16014-1 to -4).

In another embodiment, the polymer is a silicone. These polymers consist of an inorganic silicon-oxygen backbone ( . . . —Si—O—Si—O—Si—O— . . . ) with organic side groups attached to the silicon atoms. More precisely called polymerized siloxanes or polysiloxanes, silicones are mixed inorganic-organic polymers with the general formula R—[Si(R)$_2$—O]$_n$—Si(R)$_3$, where R is an organic group such as alkyl (typically $C_{1-6}$ alkyl, and particularly $C_{1-4}$ alkyl such as methyl, ethyl, propyl, isopropyl or butyl, especially methyl) or aryl (such as phenyl or naphthyl, optionally substituted by 1 to 5 substituents selected from $C_{1-6}$ alkyl, $C_{1-6}$ alkoxy, halogen, CN and $NO_2$; preferably phenyl) and n is the number of repeating monomer [SiO(R)$_2$] units.

A particularly preferred class of silicone polymers is polydimethylsiloxane (PDMS). These polymers have the general formula $CH_3$—[Si(CH$_3$)$_2$—O]$_n$—Si(CH$_3$)$_3$ where n is the number of repeating monomer [SiO(CH$_3$)$_2$] units. When the polymer is a silicone (particularly PDMS), in the above general formula, n is such that the average molecular weight (Mw) of the polymer ranges from 100 to 100,000, in some embodiments 100 to 50,000.

Coating Layer

In one embodiment, the specified degree of hydrophobicity is further defined by a coating layer on the surface.

In one embodiment, the surface has a first surface portion and a second surface portion which differ in their surface coating properties. When the hydrophobic small molecule migrates out of the bulk of the polymer onto such a surface, these result in surface portions have respective first and second specified degrees of hydrophobicity which are different from each other. In one embodiment, one portion of the surface is coated and the other is uncoated. In another embodiment, both surface portions are coated but with different materials. In this embodiment, it is preferred that the surface portions are coated with materials which differ in their electrical conductive properties (particularly if one is an electrically conductive material and the other an electrical insulator).

The polymer part may be coated with a metal or a metallic compound. In one embodiment, the polymer part is coated with a metal. In this specification the term 'metal' includes a pure metal, an alloy of pure metals (containing no non-metals), and a metal alloy containing carbon impurities, such as a steel. In one embodiment, the metal is a pure metal. In another embodiment, the metal is an alloy of pure metals containing no non-metals. In a further embodiment, the metal is a metal alloy containing carbon impurities.

The metal used to form the coating is not particularly limited provided it does not react with the polymer and is capable of reacting with a suitable functional group on the hydrophobic small molecule (as defined below) to generate a stable chemical bond. Examples of suitable metals include transition metals such as scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum and gold; lanthanoids such as lanthanum, cerium, praseodymium, neodymium, promethium, samarium, europium, gadolinium, terbium, dysprosium, holmium, erbium, thulium, ytterbium and lutetium; and p-block metals such as aluminium, gallium, indium, tin, thallium, lead and bismuth. Examples of suitable alloys of pure metals include ferroalloys, which are alloys of iron with one or more other elements and include ferroaluminium, ferrocerium, ferrochromium, ferromanganese, ferromolybdenum, ferroniobium, ferronickel, ferrotitanium, ferrovanadium and ferrotungsten. Examples of suitable metal alloys containing carbon impurities include carbon steels, particularly stainless steel (defined as a steel alloy containing iron and chromium with a minimum of 10.5% to 11% chromium content by mass). Suitably, the metal is include copper, palladium, silver, platinum or gold, particularly gold.

In one embodiment, the polymer part is coated with a metallic compound. In this specification the term 'metallic compound' means a compound of a metal (as defined above) with a more electronegative non-metal element other than carbon. Typical examples include silicides, borides, nitrides and oxides.

In one embodiment, the metallic compound is a conductive metal oxide. These materials are metal oxides doped with another metal in sufficient amounts to cause the material to be electrically conductive. Examples of conductive metal oxides include indium tin oxide (ITO), tin oxide, $SnO_2$; antimony- or fluorine doped tin oxide, $Sb:SnO_2$, $F:SnO_2$; indium-doped cadmium oxide; zinc oxide, $ZnO$; and aluminium-doped zinc oxide $Al:ZnO$.

Carbon nanotube films may also be used.

In another embodiment, the coating may be a non-metal oxide or nitride. Particular examples of suitable non-metal oxides include silica. Particular examples of suitable non-metal nitrides include silicon nitride.

The polymer part may have one or several surfaces coated with the metal or metallic compound. In one embodiment only one surface is coated with the metal or metallic compound.

The thickness of the coating may vary depending on the nature of the polymer, the small molecule, the coating material and the intended application of the polymer. Typically, the thickness of the coating ranges from 1 nm to 1 μm, in some embodiments from 5 to 500 nm, in some embodiments 5 to 100 nm.

The coating may be applied to the polymer part using any technique known to those skilled in the art. Examples of suitable coating methods include thin-film deposition methods, including physical deposition methods such as physical vapour deposition, sputtering, pulsed laser deposition and cathodic arc deposition, and chemical deposition methods such as plating, chemical vapour deposition and chemical solution deposition.

It is preferred according to the present technology that the film is applied via physical or chemical vapour deposition. For example, the film can be applied by physical vapour deposition of a metal or non-metal from one or more sources.

In one embodiment, the metal coating on the surface of the polymer is oxidised. This can be done by any suitable oxidation technique known in the art, such as heating. Preferred is oxygen plasma because it is a fast and reliable dry processing technique.

In an alternative embodiment, none of the surfaces of the polymer are coated and the surface of the polymer part incorporating the hydrophobic small molecule is bare prior to migration of the hydrophobic small molecule.

In one embodiment, part of the metal layer can be removed by etching or ablating, allowing a method for patterning the same article with regions of differing surface properties. The surface property of the etched or ablated region would be that of the bare polymer incorporating the small molecule in its bulk. Etching can be carried out using a number of techniques well known to those skilled in the art, typically using an acid and/or an oxidising agent. Laser ablation can also be carried out using a number of techniques well known to those skilled in the art.

Hydrophobic Small Molecule

In the methods and compositions of the present technology, a hydrophobic small molecule is incorporated into the bulk of the polymer part. When the polymer part is subsequently annealed, the hydrophobic small molecules migrate to a surface of the polymer part to provide that surface with a specified degree of hydrophobicity defined by the combination of the polymer and the hydrophobic small molecule.

To enable the hydrophobic small molecule compounded into the polymer bulk to pass into the vapour phase in a confined space and then adsorb to a bare polymer surface or coated surface of the polymer part, the hydrophobic small molecule and the polymer should be essentially inert to one another: in other words, the hydrophobic small molecule and the polymer bulk into which it is incorporated must have no or minimal affinity with one another. The relative affinity of the hydrophobic small molecule and the polymer bulk into which it is incorporated can be measured experimentally. In particular, where the polymer is polypropylene or a cycloolefin polymer—and the hydrophobic small molecule is a long-chain ($C_{6-30}$) carboxylic acid, it is possible to measure using solvent techniques how much of the acid is extractable from the compounded polymer. It is also possible to distinguish which molecular weight fractions of the small molecule mixture are preferentially extracted.

In addition, the hydrophobic small molecule should be able to exert a vapour pressure at a reasonably practicable elevated temperature (in some embodiments, at the annealing temperature) in order to be able to migrate from the bulk of the polymer part to its surface. Suitably, the vapour pressure of the hydrophobic small molecule is in the range of 1 Pa to 100 Pa when the temperature is 80 to 200° C. In particular, the vapour pressure of the hydrophobic small molecule is typically in the range of 5 to 50 Pa when the temperature is 100 to 155° C. In order to exert sufficient vapour pressure at the annealing temperature, suitably the molecular weight of the hydrophobic small molecule is 100 to 500, in some embodiments 150 to 400, in some embodiments 200 to 350.

To optimise the extractable hydrophobic small molecule from a specific polymer, generally both the concentration and molecular weight of the hydrophobic small molecule should be considered.

The hydrophobic small molecule generally contains functional groups having sufficient hydrophobicity to impart the required specified degree of hydrophobicity defined by the combination of the polymer and the hydrophobic small molecule. The required degree of hydrophobicity will vary depending on the polymer, the metal coating and the intended use of the final product.

The degree of hydrophobicity is defined by the contact angle, which is the angle between a horizontal flat surface and a tangent on the surface from a liquid droplet formed thereon. Contact angle determination is usually performed by deposition of a liquid drop with a micropipette. The contact angle on a given surface will vary with the volume of the liquid drop, the liquid type, the liquid's charge state and other environmental factors such as temperature and pressure. Wherein a water contact angle smaller than 90° is considered hydrophilic and a contact angle greater than 90° is considered hydrophobic. In this document, we refer to the degree of hydrophobicity as a generic term including not only hydrophobic, but also hydrophilic contact angles.

In one embodiment, the hydrophobic small molecule is lipophilic. By 'lipophilic' means preferential solubility in non-polar organic solvents. Preferably, such non-polar organic solvents have one or more of the following properties:
(a) a low dielectric constant (for example, a dielectric constant less than 20, preferably less than 10) and/or
(b) a weak or zero dipole moment (for example, a dipole moment of less than 1 D, preferably less than 0.5 D); and/or
(c) no hydrogen-bonding groups (O—H and/or N—H).

Examples of such non-polar organic solvents include aliphatic hydrocarbons such as pentane, hexane, 2-methylpentane or heptane, alicyclic hydrocarbons such as cyclohexane, aromatic hydrocarbons such as benzene, toluene or xylene, ethers such as diethyl ether, and halogenated hydrocarbons such as dichloromethane, trichloromethane (chloroform) and 1,2-dichloroethane.

In one embodiment, the hydrophobic small molecule includes one or more straight- or branched chain, saturated or unsaturated, hydrocarbyl (for example, alkyl, alkenyl or alkynyl) groups having 6 to 30 carbon atoms, such as at least 8 to 24, especially 10 to 22, particularly 12 to 18, for example 12, 14, 16 or 18 carbon atoms. In one embodiment, such a hydrocarbyl group is an alkyl group (i.e. a saturated, straight- or branched chain hydrocarbyl group). Examples of suitable alkyl groups include n-hexyl, 2-methylpentyl, 3-methylpentyl, 2-ethylbutyl, 2,2-dimethylbutyl, n-heptyl, 2-methylhexyl, 3-methylhexyl, 2-ethylpentyl, 3-ethylpentyl, 2,2-dimethylpentyl, n-octyl, 2-methylheptyl, 3-methylheptyl, 2-ethylhexyl, 2,2-dimethylhexyl, n-nonyl, 2-methyloctyl, 3-methyloctyl, 2-ethylheptyl, 3-ethylheptyl, 2,2-dimethylheptyl, n-decyl, 2-methylnonyl, 3-methylnonyl, 2-ethyloctyl, 2,2-dimethyloctyl, n-undecyl, 2-methyldecyl, 3-methyldecyl, n-dodecyl, 2-methylundecyl, 3-methylundecyl, n-tridecyl, 2-methyldodecyl, 3-methyldodecyl, n-tetradecyl, 2-methyltridecyl, 3-methyltridecyl, n-pentadecyl, 2-methyltetradecyl, 3-methyltetradecyl, n-hexadecyl, 2-methylpentadecyl, 3-methylpentadecyl, n-heptadecyl, 2-methylhexadecyl, 3-methylhexadecyl, n-octadecyl, 2-methylheptadecyl, 3-methylheptadecyl, n-nonadecyl, 2-methyloctadecyl, 3-methyloctadecyl, n-icosyl, n-henicosyl, n-docosyl, n-tricosyl, n-tetracosyl, n-pentacosyl, n-hexacosyl, n-heptacosyl, n-octacosyl, n-nonacosyl and n-triacontyl.

Alternatively, the hydrocarbyl group in the hydrophobic small molecule comprises an alkenyl group, which is a straight- or branched chain group having at least one double bond, for example, 1 to 5 double bonds, preferably 1, 2 or 3 double bonds. Examples of suitable alkenyl groups include 1-hexenyl, 2-hexenyl, 1-heptenyl, 2-heptenyl, 1-octenyl, 2-octenyl, 1-nonenyl, 2-nonenyl, 1-decenyl, 1-dodecenyl, 2-dodecenyl, 1-tetradecenyl, 2-tetradecenyl, 1-hexadecenyl, 1-octadecenyl, 1-icosenyl, 1-docosenyl, 1-tetracosenyl, 1-hexacosenyl, 1-octacosenyl and 1-triacontenyl.

In one embodiment, the hydrophobic small molecule includes one or more cycloalkyl or cycloalkenyl groups having 6 to 12 carbon atoms. Examples of suitable cycloalkyl groups include cyclohexyl, cycloheptyl, cyclooctyl, cyclononyl, cyclodecyl, cycloundecyl and cyclododecyl groups. Examples of suitable cycloalkenyl groups include cyclohexenyl and cyclooctenyl groups.

In one embodiment, the hydrophobic small molecule includes one or more straight- or branched chain, saturated or unsaturated, acyl groups, i.e. groups of the formula R—C(=O)— wherein R is a hydrocarbyl group (for example, alkyl, alkenyl, alkynyl or cycloalkyl). Typically, such acyl groups have a total of 6 to 30 carbon atoms, such as 8 to 24, especially 10 to 22, particularly 12 to 18, for example 12, 14, 16 or 18 carbon atoms (including the carbonyl carbon). In one particular embodiment, such an acyl group is an alkanoyl group (i.e. the group R is alkyl). Alternatively, such an acyl group comprises an alkenoyl group (i.e. the group R is alkenyl), which may have, for example, 1 to 5 double bonds, preferably 1, 2 or 3 double bonds. Examples of acyl groups include saturated acyl groups such as butanoyl (butyryl), hexanoyl (caproyl), octanoyl (caprylyl), decanoyl (capryl), dodecanoyl (lauroyl), tetradecanoyl, (myristoyl), hexadecanoyl (palmitoyl), octadecanoyl (stearoyl), icosanoyl (arachidonyl), docosanoyl (behenoyl) and tetracosanoyl (lignoceroyl) groups, and unsaturated acyl groups such as cis-tetradec-9-enoyl (myristoleyl), cis-hexadec-9-enoyl (palmitoleyl), cis-octadec-9-enoyl (oleyl), cis cis-9,12-octadecadienoyl (linoleyl), cis,cis,cis-9,12,15-octadecatrienoyl (linolenyl), and cis,cis,cis-5,8,11,14-eicosa-tetraenoyl (arachidonyl) groups.

In one embodiment, the hydrophobic small molecule includes one or more aromatic groups. Examples of suitable aromatic groups include phenyl and naphthyl groups. The aromatic groups are optionally substituted by one or more, in some embodiments 1 to 5, in some embodiments 1 to 3, in some embodiments 1 or 2, in some embodiments 1 substituent. Examples of suitable substituents include halogen, —R, —OR, —SR, —NO$_2$, —CN, —CO$_2$R, —CONR$_2$, —COR, —NRCOR, —NR$_2$, —SOR, —SO$_2$R, —SO$_3$H, or —SO$_2$NR$_2$ (wherein the or each group R is independently hydrogen or $C_{1-30}$ alkyl, $C_{2-30}$ alkenyl or $C_{3-12}$ cycloalkyl).

When the polymer is coated with a metal, the hydrophobic small molecule must also contain a functional group capable of forming a chemical bond to a metal atom. The presence of a functional group on the hydrophobic small molecules enables improved self-stabilisation of the polymer surface. Typically, such functional groups include those based on oxygen, nitrogen, phosphorus or sulphur. Examples of suitable functional groups include —OR, —SR, —CO$_2$R, —NR$_2$, or —SO$_3$H (wherein the or each group R is independently hydrogen or $C_{10}$ alkyl, $C_{2-30}$ alkenyl or $C_{3-12}$ cycloalkyl). In some embodiments, the functional group is —OH, —SH or —CO$_2$H.

In one embodiment, the hydrophobic small molecule is a fatty acid, i.e. a carboxylic acid of the formula R—C(=O)—OH wherein R is a hydrocarbyl group (for example, alkyl, alkenyl or alkynyl) having a total of 6 to 30 carbon atoms, such as 8 to 24, especially 10 to 22, particularly 12 to 18, for example 12, 14, 16 or 18 carbon atoms (including the carbonyl carbon) or a mixture thereof. Examples of suitable fatty acids include saturated fatty acids such as hexanoic (caproic) acid, octanoic (caprylic) acid, decanoic (caprylic) acid, dodecanoic (lauric) acid, tetradecanoic (myristic) acid, hexadecanoic (palmitic) acid, octadecanoic (stearic) acid, icosanoic (arachidic) acid, docosanoic (behenic) acid and tetracosanoic (lignoceric) groups, and unsaturated fatty acids such as cis-tetradec-9-enoic (myristoleic) acod, cis-hexadec-9-enoic (palmitoleic) acid, cis-octadec-9-enoic (oleic) acid, cis cis-9,12-octadecadienoic (linolelic) acid, cis,cis,cis-9,12,15-octadecatrienoic (linolenic) acid, and cis,cis,cis-5,8,11,14-eicosa-tetraenoyl (arachidonic) acid, and mixtures thereof. In some embodiments, the fatty acid is tetradecanoic (myristic) acid, hexadecanoic (palmitic) acid or octadecanoic (stearic) acid, or a mixture thereof.

In one embodiment, the hydrophobic small molecule is a thiol, i.e. a compound of formula R—SH wherein R is includes one or more straight- or branched chain, saturated or unsaturated, hydrocarbyl (for example, alkyl, alkenyl, alkynyl, aryl or aralkyl) groups having 6 to 30 carbon atoms, such as at least 8 to 24, especially 10 to 22, particularly carbon atoms, the hydrocarbyl group being optionally substituted by one or more halogen atoms (particularly fluorine atoms) or a hydroxyl (—OH) group. In one embodiment, such a hydrocarbyl group is an alkyl group optionally substituted by one or more halogen atoms (particularly fluorine atoms) or a hydroxyl (—OH) group; in some embodiments, the hydroxyl group is present at the carbon atom furthest from the thiol group. Examples of suitable thiols include aliphatic thiols such as 1-hexanethiol, 2-hexanethiol, 6-hydroxy-1-hexanethiol, 1H,1H,2H,2H-perfluoro-1-hexanethiol, 1-heptanethiol, 2-heptanethiol, 3-heptanethiol, 2-ethylhexanethiol, 7-hydroxy-1-heptanethiol, 1-octanethiol, 2-octanethiol, 8-hydroxy-1-octanethiol, 1-nonanethiol, 2-nonanethiol, tart-nonanethiol, 9-hydroxy-1-nonanethiol, 1-decanethiol, 10-hydroxy-1-decanethiol, 1H,1H,2H,2H-perfluoro-1-decanethiol 1-undecanethiol, 11-hydroxy-1-undecanethiol, 1-dodecanethiol, 12-hydroxy-1-dodecanethiol, 1-tridecanethiol, 13-hydroxy-1-tridecanethiol, 1-tetradecanethiol, 14-hydroxy-1-tetradecanethiol, 1-pentadecanethiol, 15-hydroxy-1-pentadecanethiol, 1-hexadecanethiol, 16-hydroxy-1-hexadecanethiol, 1-heptadecanethiol, 17-hydroxy-1-heptadecanethiol, 1-octadecanethiol, 18-hydroxy-1-octadecanethiol, 1-nonadecanethiol, 19-hydroxynonadecanethiol, 1-icosanethiol, 20-hydroxy-1-icosanethiol, 1-henicosanethiol, 21-hydroxy-1-henicosanethiol, 1-docosanethiol, 22-hydroxy-1-docosanethiol, 1-tricosanethiol, 23-hydroxy-1-tricosanethiol, 1-tetracosanethiol, 24-hydroxy-1-tetracosanethiol 1-pentacosanethiol, 25-hydroxy-1-pentacosanethiol, 1-hexacosanethiol, 26-hydroxy-1-hexacosanethiol, 1-heptacosanethiol, 27-hydroxy-1-heptacosanethiol, 1-octacosanethiol, 28-hydroxy-1-octacosanethiol, 1-nonacosanethiol, 29-hydroxy-1-nonacosanethiol, 1-triacontanethiol and 30-hydroxy-1-triacontanethiol. In some embodiments, the thiol is selected from 1-undecanethiol, 11-hydroxy-1-undecanethiol, 1-octadecanethiol, 1-henicosanethiol, 21-hydroxy-1-henicosanethiol and 1-docosanethiol; aromatic thiols such as thiophenol, 1-napthalenethiol, 2-napthalenethiol, 1-anthracenethiol, 2-anthracenethiol, biphenyl-1-thiol, biphenyl-2-thiol; and aralkyl thiols such as benzylthiol, phenethylthiol, 1-napthylmethylthiol and 2-napthylmethylthiol. As described in Folkers et al. *Langmuir,* 1992, 8(5), 1330-1341 and Laibnis et al. *J. Am. Chem. Soc.* 1991, 113, 7152-7167, aliphatic thiols form self-assembled monolayers on metal surfaces (particularly copper, silver and gold).

In one embodiment, the hydrophobic small molecule is a phenol, i.e. a compound containing one or more (preferably 1, 2, or 3) hydroxyl groups bonded directly to an aromatic group (as defined and exemplified above). Examples of suitable phenols include phenol, 2-methylphenol, 3-methylphenol, 4-methylphenol, benzenediols such as catechol (1,2-benzenediol), resorcinol (1,3-benzenediol), hydroquinone (1,4-benzenediol), benzenetriols such as hydroxyquinol (1,2,4-benzenetriol), phloroglucinol (1,3,5-benzenetriol) and pyrogallol (1,2,3-benzenetriol) and naphthols such as 1-naphthol and 2-naphthol, or a mixture thereof. A preferred example is resorcinol.

Method

The method of the technology comprises two essential steps (a) and (b), described below.

The initial step (a) comprises incorporating the hydrophobic small molecule into the polymer. This step may be carried out before, during or after manufacture of the polymer part, and may be carried out by any suitable method known to those skilled in the art. For example, the hydrophobic small molecule may be incorporated before manufacture of the polymer part by including the small molecule species as an additive of the polymer raw material (e.g. granules) used to form the polymer part in an injection moulding process. For example, the hydrophobic small molecule may be incorporated during manufacture of the polymer part by injecting the small molecule species in solid or liquid form into the barrel of an injection moulding machine ahead of the injection nozzle. For example, the hydrophobic small molecule may be incorporated during manufacture of the polymer part by placing the polymer part in a chamber in which the small molecule species is in gaseous form, e.g. carried by organic molecules in a carrier gas, are held at overpressure and elevated temperature so that the small molecules are absorbed into the polymer part.

The polymer part may be manufactured by compounding, which comprises preparing the polymer formulations by mixing or/and blending polymers and additives in a molten state. Different techniques may be used to achieve a homogenous blend of the different raw material. Examples of suitable techniques, known to the person skilled in the art, include dispersive and distributive mixing followed by heating. Co-kneaders and twin screws (which may be co- or counter rotating) as well internal mixers may be used for compounding.

In an alternative embodiment, the hydrophobic small molecule may be incorporated into the polymer using a wet solution method. The hydrophobic small molecule and the polymer can be pre-dissolved in solvents that are miscible, the two solutions blended together and then dried. The dried polymer will then be impregnated with the hydrophobic small molecule. Examples of suitable solvents include those non-polar organic solvents described above in which lipophilic molecules and polyolefin polymers are mutually soluble.

The subsequent step (b) comprises annealing the polymer part to induce migration of the hydrophobic small molecules to a surface of the polymer part to provide that surface with a specified degree of hydrophobicity defined by the combination of the polymer and the hydrophobic small molecule. The annealing may be carried out using any suitable method known to those skilled in the art. For example, the annealing may be carried out in a convection oven. Step (b) is typically carried out at a temperature of 50 to 150° C., in some embodiments 60 to 120° C. Generally the anneal temperate should be kept some way below a relevant glass transition temperature or melting temperature for the polymer, but elevated from ambient temperature to promote migration of the small molecule in the polymer matrix and if relevant through the metal or other coating layer, since migration will usually be a thermally activated process subject to an exponential increase in rate or speed of migration with temperature above an activation threshold. Typically the annealing lasts 1 hour to 24 hours, suitably 2 hours to 12 hours.

In some embodiments, the annealing step induces migration of the hydrophobic small molecules to a surface of the polymer part to provide the surface of an adjacent part with a specified degree of hydrophobicity by vaporisation onto an adjacent surface defined by the combination of the polymer and the hydrophobic small molecule. This annealing step is particularly suitable when a metal coating is provided on a surface of the polymer part, as it has been surprisingly found that the hydrophobic small molecule adsorbs onto the metal surface of the adjacent polymer part.

For a polymer substrate with a metal-coated surface, it has found that the anneal/bake is more efficient at rendering the metal-coated surface hydrophobic with the desired degree of hydrophobicity, if another polymer part is arranged with an uncoated surface facing the metal-coated surface. The mechanism at play is evaporation of the small molecule from the facing bare polymer surface onto the metal surface. Although in any one polymer part some migration of the small molecule from the body of the polymer through the metal film takes place and this is accelerated by heating, the metal film still acts to slow the migration, i.e. the metal film appears to form a barrier, but not an absolute barrier, to small molecule migration, making the direct deposition quicker to achieve at any given anneal temperature than a process in which the surface can only be stabilized by migration through the metal film.

FIG. 1 shows schematically the arrangement used in a convection oven 3. A plurality of polymer parts 1 are arranged vertically in a stack. Each polymer part 1 comprises a polymer substrate 4 coated on one side with a metal film 2. All polymer parts except the leftmost polymer part have their metal-coated surface adjacent the bare backside of the neighbouring polymer part. In this arrangement, the leftmost polymer part in the stack was observed to have lower hydrophobicity, which we deduce was caused by the absence of an adjacent bare polymer surface. The small molecule surface treatment of one part is that partly provided by evaporation of the small molecule from another similar part, as indicated schematically by the arrows. Variations of this approach using the same principle can be envisaged. For example, the polymer parts could be arranged in a circle so that the metal-coated surface of all polymer parts has an adjacent bare surface of a neighbouring part. Moreover, the small molecule deposition on the metal surface could be provided by a dedicated small molecule source (e.g. a metallo-organic source gas or solid state molecular source) or by a special part containing the small molecules which is not one of the parts being manufactured. There may also be other non-metal surface coatings which also benefit from this approach.

In some embodiments, the method of the technology additionally includes the following step subsequent to step (a) but prior to step (b):

(a1) coating said surface of the polymer part with a metal or a metallic compound (as defined and exemplified above). The coating step (a1) may be carried out using any technique known to those skilled in the art. Examples of suitable coating methods include thin-film deposition methods, including physical deposition methods such as physical vapour deposition, sputtering, pulsed laser deposition and cathodic arc deposition, and chemical deposition methods such as plating, chemical vapour deposition and chemical solution deposition. In some embodiments, the coating is applied via physical or chemical vapour deposition.

In some embodiments, the method of the technology additionally comprises the following step (a2) subsequent to step (a1) but prior to step (b):

(a2) oxidising the metal or metallic compound on said surface. Oxidation of the metal or metallic compound can influence the attachment of the small molecule and therefore the degree of hydrophobicity on the polymer surface.

In some embodiments, the method of the technology additionally comprises the step subsequent to step (a1) but prior to step (b):

(a2) performing a plasma treatment of said surface of the polymer part.

Plasma treatment is particularly suitable when the metal is a noble metal (in other words, a metal that is resistant to corrosion and oxidation in moist air under ambient conditions, such as ruthenium, rhodium, palladium, silver, osmium, iridium, platinum or gold, particularly silver or gold), as it facilitates the functionalization of the metal surface to enable a more stable chemical bond to form with the hydrophobic small molecule.

Oxygen plasma treatment is especially suitable when the metal is a noble metal (as defined above, particularly gold), as this oxidises the metal surface such that oxygen atoms are present on the surface. Such oxygen atoms are capable of forming chemical bonds with a number of classes of hydrophobic small molecules. Oxygen plasma treatment is particularly favourable when the hydrophobic small molecule is a carboxylic acid, as a stable ester bond can be formed with the oxygen atom on the metal surface and the acyl part of the fatty acid molecule.

The degree of hydrophobicity of the functional surface, i.e. its contact angle, can be set to a desired value by applying different amounts or types of plasma treatment. Plasma techniques can deposit ultra thin (a few nm), adherent, conformal coatings. Glow discharge plasma is created by filling a vacuum with a low-pressure gas (e.g. argon, ammonia, or oxygen). The gas is then excited using microwaves or current which ionizes it. The ionized gas is then thrown onto a surface at a high velocity where the energy produced physically and chemically changes the surface. After the changes occur, the ionized plasma gas is able to react with the surface to lower the surface energy. In oxygen plasma the surface becomes more hydrophilic as the carbons in the plastic are oxidized. Plasma polymerization is a special variant of the plasma-activated chemical vapour deposition (PE-CVD) specifically suitable for providing biocompatible surfaces. During plasma polymerization vaporized organic precursors (precursor monomers) are activated in the process chamber, initially by a plasma. Activation caused by the ionized molecules which are formed already in the gas phase result first in molecular fragments. The subsequent condensation of these fragments on the substrate surface then causes under the influence of substrate temperature, electron and ion bombardment, the polymerization and thus the formation of a closed plasma polymerized layer. The structure of the emerging "plasma polymer" is comparable to highly cross-linked thermosets, because they form a largely random covalent network. Such a layer can be hydrophilic.

Corona treatment (sometimes referred to as air plasma) is a surface modification technique that uses a low temperature corona discharge plasma to impart changes in the properties of a surface. A linear array of electrodes is often used to create a curtain of corona plasma. Corona treatment is a widely used surface treatment method in the polymer parts.

The amount of plasma treatment can be dosed by the power applied. Suitably, the power applied ranges from 100 to 1000 W, for example 200W, 300 W, 400 W, 500 W, or 800 W.

The whole or selected parts of the surface can be exposed to plasma with standard lithographical techniques by using suitable sacrificial layers to mask parts of the surface which are not to be exposed to the plasma which can then be removed after the plasma treatment.

It is noted that even if a polymer part with a desired contact angle can be achieved without incorporating a small molecule additive as described herein, either since the polymer has the desired contact angle in its native condition, or because the surface of the polymer part can be plasma treated to the desired contact angle, it may nevertheless be desirable to include a small molecule additive as described herein in order that long-term stability of the contact angle is ensured. Furthermore, although the bare polymer may be hydrophobic it may not be thermally or electrically conductive as is the case with a hydrophobic metal-coated polymer part.

In one embodiment, the polymer part is produced by injection moulding. Therefore, in some embodiments, the technology provides an injection moulding process for producing a polymer part, the method comprising the following steps:
(a) providing polymer raw material incorporating a hydrophobic small molecule;
(b) melting the polymer raw material in a polymer melting stage;
(c) supplying the molten polymer raw material under pressure through a nozzle to fill a mould;
(d) ejecting the polymer part from the mould; and
(e) annealing the polymer part to induce migration of the small molecules to a surface of the polymer part to provide that surface with a specified hydrophobicity defined by the combination of the polymer and the hydrophobic small molecule.

Figure 2:
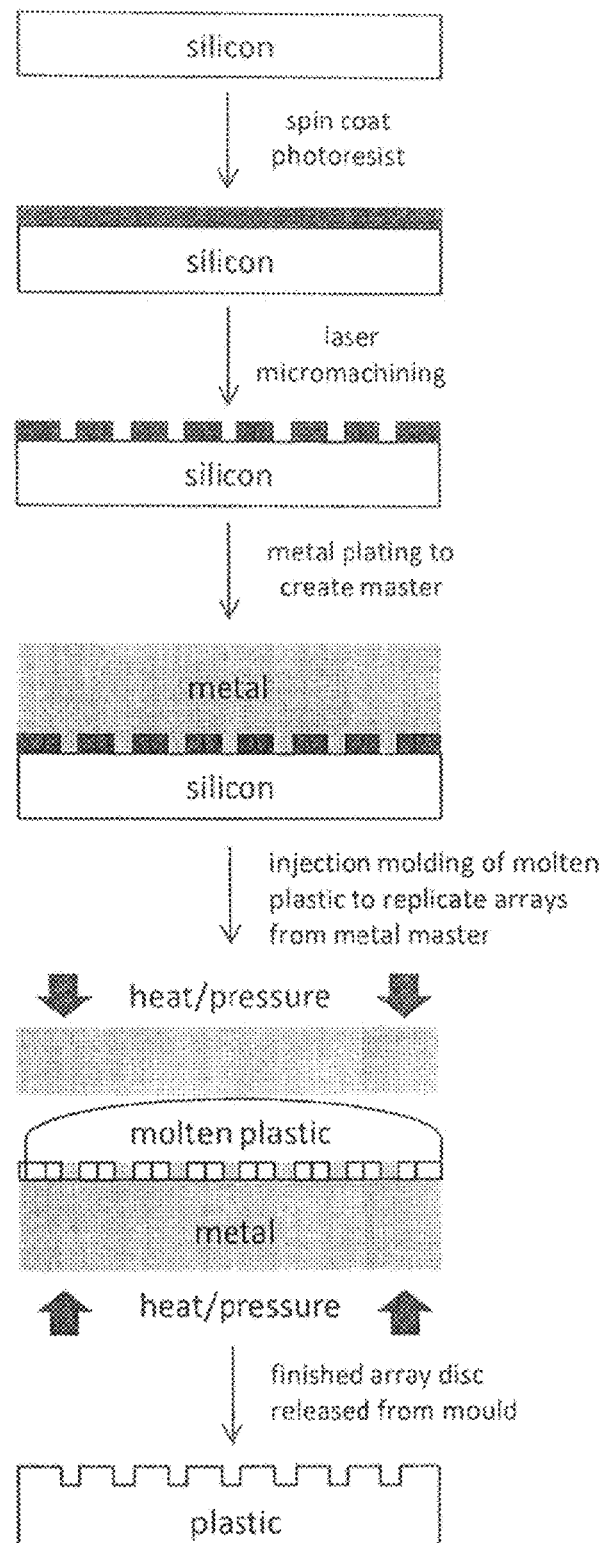
FIG. 2 shows the principal steps in a substrate manufacturing process.

FIG. 2 shows the principal steps in a substrate manufacturing process using injection moulding.

The first part of the process is to manufacture a master. A silicon or glass wafer is spin coated with a photoresist. An excimer laser or other suitable light source is then used to expose the photoresist to define a structure with high spatial resolution, for example by direct laser micromachining. The material to be exposed is transparent to the laser light used. However, in the focal volume of this highly focused laser beam chemical or physical modification is created. Ultimately a selective solubility of the exposed area relative to the surrounding is achieved. In a developer bath, depending on the used photosensitive material exposed or unexposed areas are removed. Thus, almost any 3D structures from a variety of photosensitive materials can be realized (i.e. SU-8). Alternative technologies for structuring the resist master are e-beam lithography or mask based lithography processes. Laser write lithography can also be used with inorganic phase transition materials instead of the photoresist pushing the size resolution limit below the wavelength of the laser. Further details of applicable processes can be found in JP4274251 B2 (=US2008231940A1) and JP 2625885 B2 (no English equivalent).

Once the photoresist has been suitably structured and the exposed (or non-exposed) material removed, a metal plating processing step is applied. Electroplating is used to deposit a nickel layer by electrolysis of nickel salt-containing aqueous solutions, so-called nickel electrolytes. Nickel electrolytes usually have nickel or nickel pellets as the anode. They serve the supply of metal ions. The process for the deposition of nickel has long been known and been highly optimized. Most nickel electrolytes to achieve an efficiency of >98%, which means that over 98% of the current supplied to be used for metal deposition. The remaining power is lost in unwanted electrolytic processes, such as hydrogen. The transcription of lithographically structured micro-features is strongly dependent on compliance with the correct parameters. The continuous supply of additives, but also the metal ion content and the temperature and the pH value needs to be.

This electroplating process can be repeated either to make multiple copies of the same master from the silicon or to create a negative copy from the first metal stamper that is produced from the silicon.

Direct milling into steel can be used as an alternative to silicon and photoresist in order to master such microstructures.

The master is then used in an injection molding process to create the structured surfaces in polymer to incorporate both the structuring needed for the microfluidic channel network and also the multi-level pits. In an injection molding machine, polymers are plasticized in an injection unit and injected into a mould. The cavity of the mould determines the shape and surface texture of the finished part. The polymer materials need to be treated carefully to prevent oxidation or decomposition as a result of heat or sheer stresses. Heat and pressure are applied to press molten polymer onto the structured surface of the master. After a suitable filling, cooling and hardening time, the finished structure is ejected from the mold.

The cost of the master and the larger moulding tool it will form a part of represents a large part of the total necessary investment, so the process lends itself to high volumes. Simple tools enable economic viable prototyping from a threshold of a few thousand parts. Tools for production can be used up to make up to several million parts.

The injection moulded substrate can be further plasma treated to control the surfaces properties as described above. Moreover, a coating can be applied to a whole surface or selectively applied to only some areas as desired. For example, sputtering may be used to deposit a coating.

Further, it will be understood that lithography and/or etching processes can be used to selectively remove parts of a coating film, e.g. a film of metal, silica or silicon nitride, and optionally after etching deposit or remove additional material selectively, to produce a desired surface pattern and/or topography in which the hydrophobicity and/or topography is modified over the surface.

Application Examples

Figure 3:
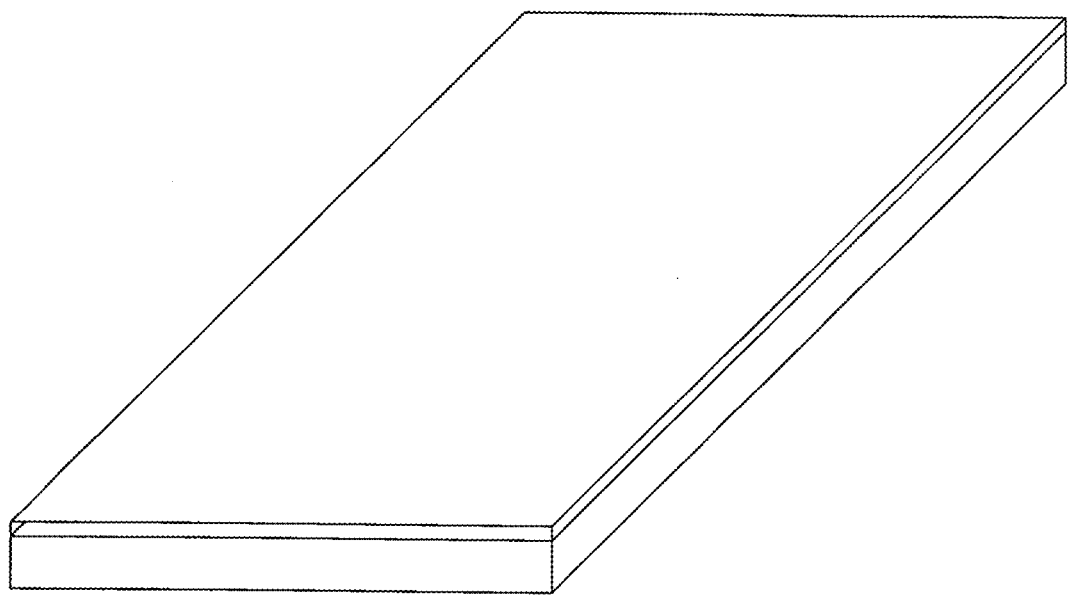
FIG. 3 is a perspective schematic view of an example MALDI target according to one application example.

FIG. 3 is a perspective schematic view of an example MALDI target 1 according to an embodiment. The MALDI target comprises a substrate 4 made of a polymer material in the form of a rectangular sheet. Other shapes, such as circular, and more irregular shapes are known. The shape tends to be fixed to conform to a particular mass spectrometer manufacturer's MALDI sample holder. The substrate 4 is coated on its upper face or side with a metal layer 2. The lower face of the substrate is not coated, i.e. left as bare polymer. The exposed metal surface hosts a two-dimensional square grid or array of spotting locations where the MALDI matrix spots will be deposited. A 6×8 array for 48 spotting locations is illustrated, however the array could be any other size, e.g. 12×8. Each spotting location 5 is indicated schematically with a cross.

The metal surface can be uniformly hydrophobic, or more preferably generally hydrophobic with small areas centred on the grid locations which are relatively hydrophilic, i.e. have a degree of hydrophobicity which is less hydrophobic than the main portion of the surface. The part is manufactured according to the methods described above.

Figure 4:
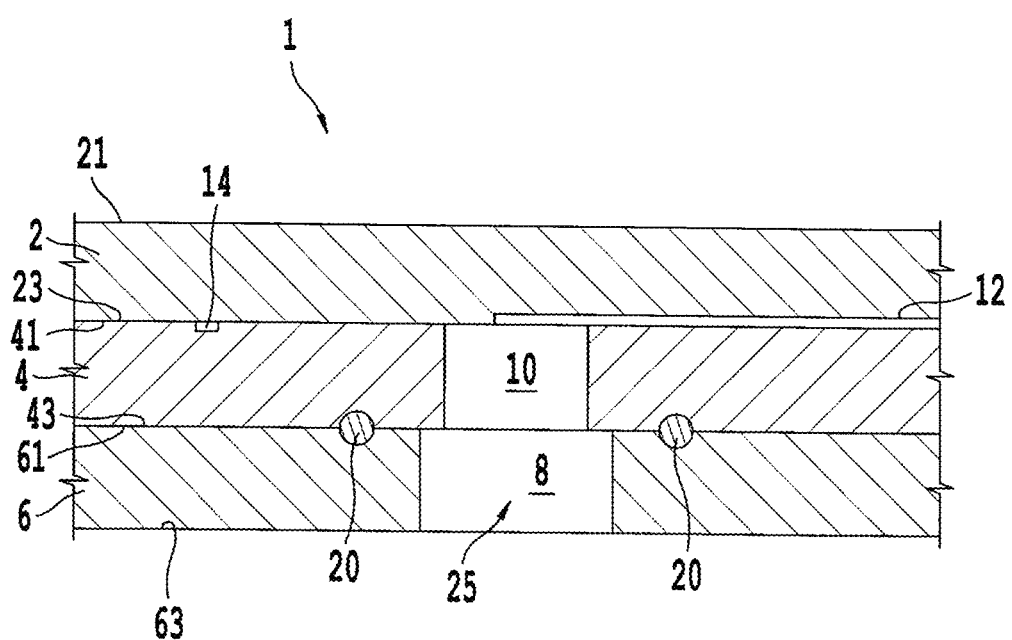
FIG. 4 is a schematic cross-section of a portion of a microfluidic device according to another application example.

FIG. 4 is a schematic cross-section of a portion of an example microfluidic device 1 made from polymer. The illustrated portion shows first, second and third substrate layers 2, 4 and 6, each made of a polymer, such as one of the polymers listed herein as being suitable for precision injection moulding. The first layer 2 has a top surface 21 and a bottom surface 23. The second layer 4 has a top surface 41 and bottom surface 43. The third layer 6 has a top surface 61 and bottom surface 63. The bottom surface 23 of the first layer 2 is bonded to the top surface 41 of the second layer 4, for example by a thermal bonding or solvent vapour bonding process suitable for bonding the polymer materials used for the layers.

A laterally extending microfluidic channel 12 is illustrated at the interface 23/41 between the first and second layers 2, 4 by surface structure in one or both of the first and second layers 2, 4 (in the illustration the surface structure is solely in the first layer 2). Another example channel 14 is also illustrated which is formed by surface structure in the second layer 4. Vertically extending through holes 8 and 10 are formed in the second and third layers 4 and 6 which are in fluid communication with the microfluidic channel 12. As illustrated, the through hole 10 in the second layer 4 need not exactly correspond dimensionally to the through hole 8 in the third layer 6. The hole 10 in the second layer acts as a conduit for fluid communication between the channel 12 and the via 8. The purpose of the via 8 is to provide external access for the supply or removal of fluid, i.e. liquid or gas, from the microfluidic circuit formed at the interface 23/41. In implementations of the design, the precise form and dimensions of the features 8 and 10 may be varied both in absolute terms and relative to each other.

Figure 5A:
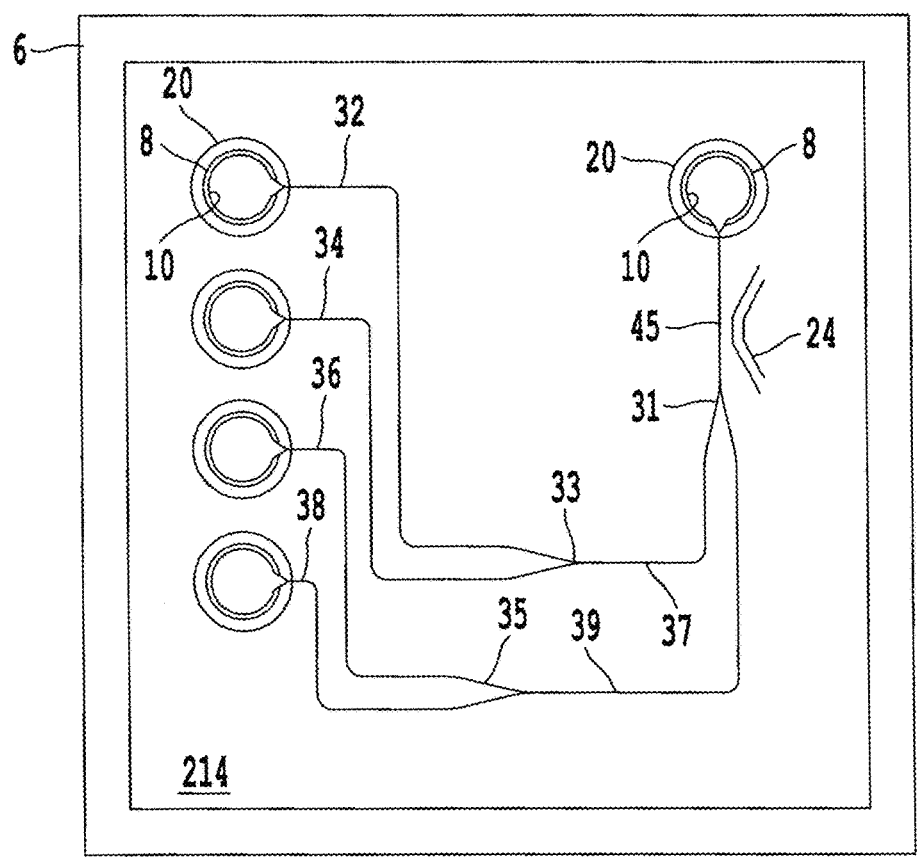
FIG. 5A is a schematic plan view of the whole example microfluidic device.
Figure 5B:
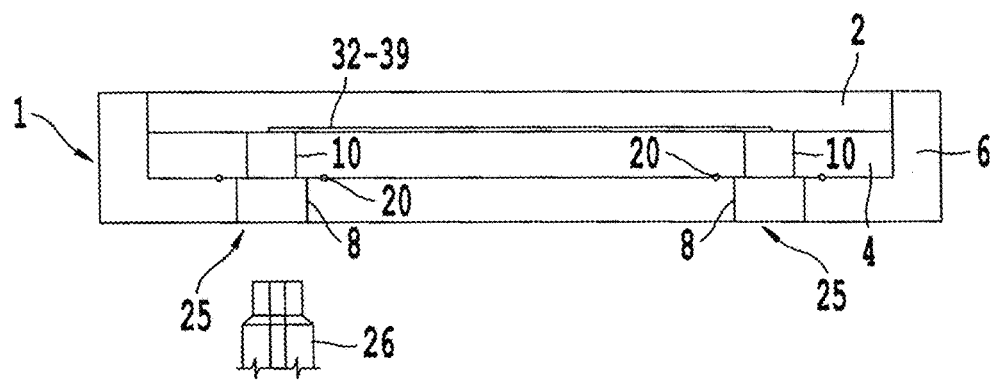
FIG. 5B is a schematic cross-section of the microfluidic device.

FIG. 5A is a schematic plan view of an example microfluidic device 1. FIG. 5B is a corresponding schematic cross-section, also showing a male luer connector 26 shaped and dimensioned to engage into the female luer connector formed by the holes 8 and 10. The third layer 6 is part of a carrier or caddy accommodating the microfluidic circuit formed by the bonded first and second layers 2 and 4. The carrier has side walls 7 which wrap around the edges of the first and second layers 2 and 4.

A highly schematic microfluidic circuit is depicted, consisting of four female luer connectors 25 as inlet ports, from which extend channels 32, 34, 36 and 38. Channels 32 and 34 join at a mixing connection 33, and channels 36 and 38 join at a mixing connection 35, the two merged channels 37 and 39 then in turn combining at a mixing connection 31 into a channel 45. An electrode portion 24 is also shown adjacent the channel 45 and serves, for example, to coalesce droplets of analyte and sample liquid passing along the channel. The channel 45 terminates in an outlet port 25 with laser weld 20. It will be appreciated that in some implementations some of the inlet/outlet ports may be sealed with O-rings (or other gasket types) and others with continuous seam welds.

One or more of the substrate layers 2, 4 and 6 contains a hydrophobic small molecule which has been incorporated before, during or after manufacture of the substrate layer concerned. The substrate layers containing the small molecule are annealed either before or after bonding the substrate layers together to induce migration of the hydrophobic small molecules to a surface of the polymer part to provide that surface with a specified degree of hydrophobicity defined by the combination of the polymer and the hydrophobic small molecule. The annealing process can be used to set the contact angle in the microfluidic device to a specified value with relatively high accuracy at critical functional surfaces, such as the walls of microfluidic channels, adjacent to electrodes, in or at the inlet and outlet of mixing chambers etc. The part is manufactured according the methods described above.

While the technology has been described with reference to two specific application examples, a MALDI target and a microfluidic device, it will be understood that the technology can find application for a wide variety of polymer parts where the degree of hydrophobicity on a surface of the part needs to be set to a desired value with long-term stability.

EXAMPLES

Example 1—Evaluation of the Effect of Polymer and Stainless Steel Metal Coating on Hydrophobic Contact Angle without Carbon Materials and Methods
The following polymers were used in this Example:
1. Cycloolefin polymer (COP) Zeonor 1060R supplied by Zeon Corporation.
2. Cycloolefin copolymer (COC) Zeonex 480 supplied by Zeon Corporation.
3. A semi-crystalline polypropylene homopolymer (PP) *Borealis* HK060AE supplied by *Borealis AG*.

A lipid mix was prepared constituting 5% myristic acid, 30% palmitic acid and 65% stearic acid by weight. The polymers were compounded to produce a polymer formulation incorporating 99.7% by weight of the polymer and 0.30% by weight of the lipid mix. The mixtures contained no added carbon.

The polymer formulations were subjected to an injection moulding process. The thickness of the moulded part was 1.6 mm. A standard MALDI microscope slide format was made using a Netstal injection moulding machine; 375 moulded parts were prepared in total. The moulded parts were coated by physical vapour deposition with a 100 nm stainless steel coating. After coating a 100 nm coating thickness no visual defects were observed.

Figure 6:
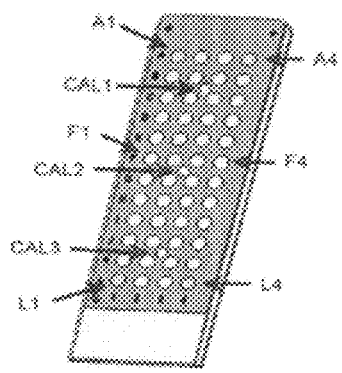
FIG. 6 illustrates the contact angle measurement points on target for the procedure described in Example 1.

Apart from the reference samples, 25 parts in 1 box (t=0), the coated parts were subjected to heat conditioning at 80° C. in a sealed box, 25 parts per box, 4 boxes for each polymer type for a time selected from 1 hour, 4 hours, 8 hours and 16 hours at 80° C., 1 box for each conditioning time. After conditioning, the contact angle with 2 µl water was measured with a Krüss Goniometer available from Krüss Optronics at measurement points on the target shown in FIG. 6. In each case, the spotting area was A1, F2 and L4. 3 pieces per condition and 5 measurement points per piece were measured and an average taken of all 15 measurements. The results obtained are set out in Table 1 below.

TABLE 1

| | Average contact angle vs. Conditioning time at 80° C. | | | | |
|---|---|---|---|---|---|
| Polymer | t = 0 (initial) | 1 hr at 80° C. | 4 hrs at 80° C. | 8 hrs at 80° C. | 16 hrs at 80° C. |
| COP | 38.2° | 50.4° | 61.3° | 67.9° | 73.8° |
| COC | 38.5° | 55.1° | 66.3° | 66.9° | 74.5° |
| PP | 73.6° | 115.6° | 115.4° | 115.6° | 115.8° |

Figure 7:
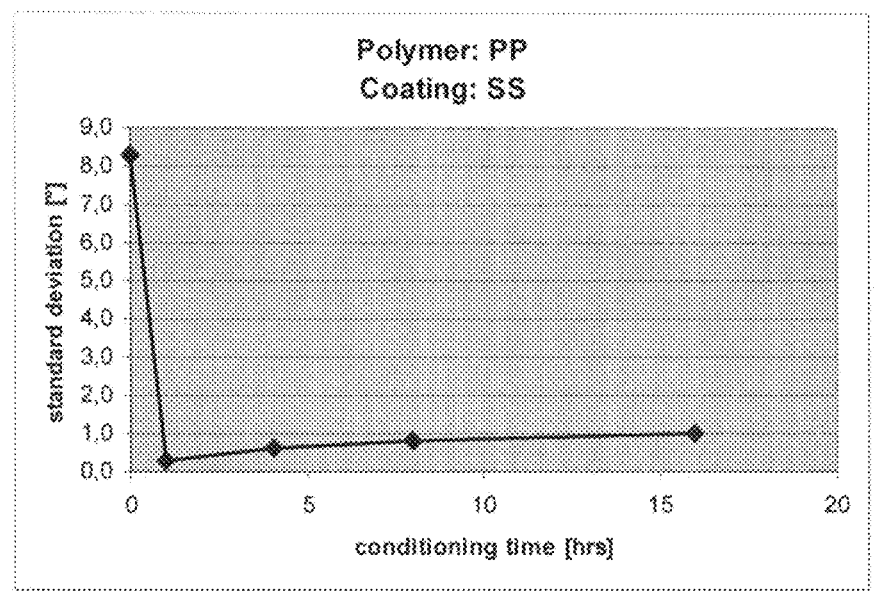
FIG. 7 is a graph illustrating the conditioning time (standard deviation) measured using PP as the polymer and stainless steel as the coating according to Example 1.

The results indicate that polypropylene was the most effective polymer and that the best combination of polymer and coating was polypropylene coated with the stainless steel in terms of the highest contact angle achieved. The optimum conditioning time was 1 hour. Moreover, the contact angle standard deviation of the PP/stainless steel combination is minimal after conditioning, as shown in FIG. 7.

Example 2—Evaluation of the Effect of Chrome Metal Coating Thickness on Hydrophobic Contact Angle without Carbon Materials and Methods
The following polymer was used to measure hydrophobicity in this Example:
1. Cycloolefin polymer (COP) Zeonor 1060R supplied by Zeon Corporation.

A lipid mix was prepared constituting 5% myristic acid, 30% palmitic acid and 65% stearic acid by weight. The polymer was compounded to produce a polymer formulation incorporating 99.7% by weight of the polymer and 0.30% by weight of the lipid mix. The mixture contained no added carbon.

The polymer formulation was subjected to an injection moulding process. The thickness of the moulded part was 1.6 mm. A standard MALDI microscope slide format was made using a Netstal injection moulding machine: 300 moulded parts were prepared in total.

The moulded parts were coated by physical vapour deposition with chrome at three different thicknesses—5 nm, 10 nm and 15 nm coating thickness.

Apart from the reference samples, 3 boxes containing 25 parts each (t=0), the coated, moulded parts were subjected to heat conditioning at 80° C. in a sealed box, 25 parts per box, 3 boxes for each chrome coating thickness for a time selected from 1 hour, 4 hours and 8 hours, 1 box for each conditioning time. After conditioning, the contact angle with 2 µl water was measured with a Krüss Goniometer available from Krüss Optronics at measurement points on the target shown in FIG. 6. In each case, the spotting area was A1, F2 and L4. 3 pieces per condition and 5 measurement points per piece were measured and an average taken of all 15 measurements. The results obtained are set out in Table 2 below.

TABLE 2

| | Average contact angle vs. Conditioning time at 80° C. | | | | |
|---|---|---|---|---|---|
| Chrome coating thickness | t = 0 (initial) | 1 hr at 0° C. | 4 hrs at 0° C. | 8 hrs at 80° C. | Visual defects after 8 hrs at 80° C. |
| 5 nm | 50.9° | 105.3° | 104.1° | 105.2° | none |
| 10 nm | 45.2° | 104.7° | 105.1° | 104.0° | none |
| 15 nm | 46.0° | 103.0° | 104.7° | 104.5° | none |

The results indicate that a lipid mix incorporated into cycloolefin polymer is effective at producing a consistent contact angle with no cracks or defects in the chrome coating. As a comparison the test was repeated using polypropylene (Polymer 3, Example 1) coated with chrome at the same coating thicknesses. All chrome coatings immediately cracked after conditioning and reliable contact angle measurements were not possible.

Examples 3 and 4—Extractability of the Hydrophobic Small Molecule

For effective passage of a hydrophobic small molecule compounded into a polymer bulk to enter the vapour phase in a sealed compartment, and then chemically attach itself to a metal coated surface in the same compartment, it was postulated that three main criteria must be satisfied.

The small molecule and the polymer bulk into which it is incorporated must have no or minimal affinity with each other.

The small molecule must be able to exert a vapor pressure at a reasonably practicable elevated temperature.

The metal coated surface and the small molecule onto which it attaches must contain functional groups so that a chemically binding interaction is possible.

This example describes the affinity of two types of polyolefin considered—polypropylene and cycloolefin polymer—when compounded with a mixture of C14, C16 and C18 fatty acids, and measures using solvent techniques how much of the small molecule is extractable from the compounded polymer, as well as distinguishing which molecular weight fractions of the small molecule mixture are preferentially extracted.

Example 3—Relative Extraction of Fatty Acids from Polypropylene and Cycloolefin Polymer The aim was to determine by analytical methods the relative extractability of a fatty acid formulation from polypropylene and cycloolefin polymers. Two polymers were used as bulk materials for fatty acid incorporation ("compounding") and subsequent solvent extraction/analytical determination of the compounded fatty acids. The polymers used were the same as those in Examples 1 and 2, polypropylene HK060AE supplied by Borealis AG (PP) and cycloolefin polymer, Zeonor 1060R supplied by Zeon Corporation (COP). The fatty acid mixture compounded into each polymer was 1:6:13 parts by weight myristic, palmitic and stearic acid. The total weight of fatty acid mixture compounded into each polymer was 0.3% parts by weight. The technique used to determine the extractable amounts of fatty acid is set out below:

Mechanical Sample Preparation
A representative polymer sample of 10 g was ground to a particle size of 0.1 µm using a centrifugal mill (Model Retsch ZM 100). The polymer powder is used for further analysis.

Chemical Sample Treatment and Isolation
Free fatty acids show relatively high melting points (for example, the melting point of stearic acid is 370° C.). This fact together with the polarity of the carbonic acid group causes limitation in a precise quantification by using gas chromatography. Therefore a conversion of the free fatty acids to their corresponding methyl esters derivatives is employed before quantification analysis.

Functional Group Conversion of Acids into Esters
a) Measure 1.5 g of polymer powder into a 10 ml vial
b) Add 4 ml methanol (Sigma-Aldrich, ≥99.9% purity by gas chromatography) and 200 µl trimethylchlorosilane (CAS-No. 75-77-4, Fluka, ≥99% purity by gas chromatography) using a syringe
c) Close the vial with a crimp cap (A1 with Butyl/PTFE Septum) and heat the mixture for 1 h at 80° C. in an oven
Isolation of the Ester
d) Allow the vial to cool to ambient temperature and add 1 ml of distilled water (Millipore purity grade) and 1 ml of 2-methylpentane (CAS-No 107-83-5, Sigma-Aldrich, ≥95% purity by gas chromatography)
e) Shake the solution and separate the organic and aqueous phase by using an ultracentrifuge (5 min at 5000 rpm)
f) Separate the upper organic phase from the lower aqueous phase by using a syringe g) Repeat step d)-f) to more times
h) Evaporate the organic phase by the gentle flow of nitrogen to dryness for about 15 minutes
i) Solve the residue in 1 ml of methanol using an ultrasonic bath for 3 minutes
Analysis by GC/MS with Thermal Desorption System
4 µl of the sample solution i) is transferred on cleaned silanised glass-wool that is placed inside a glass sample tube. The analysis is performed on a GC/MSD (Agilent) equipped with a Thermal Desorption unit (Gerstel).

Figure 8A:
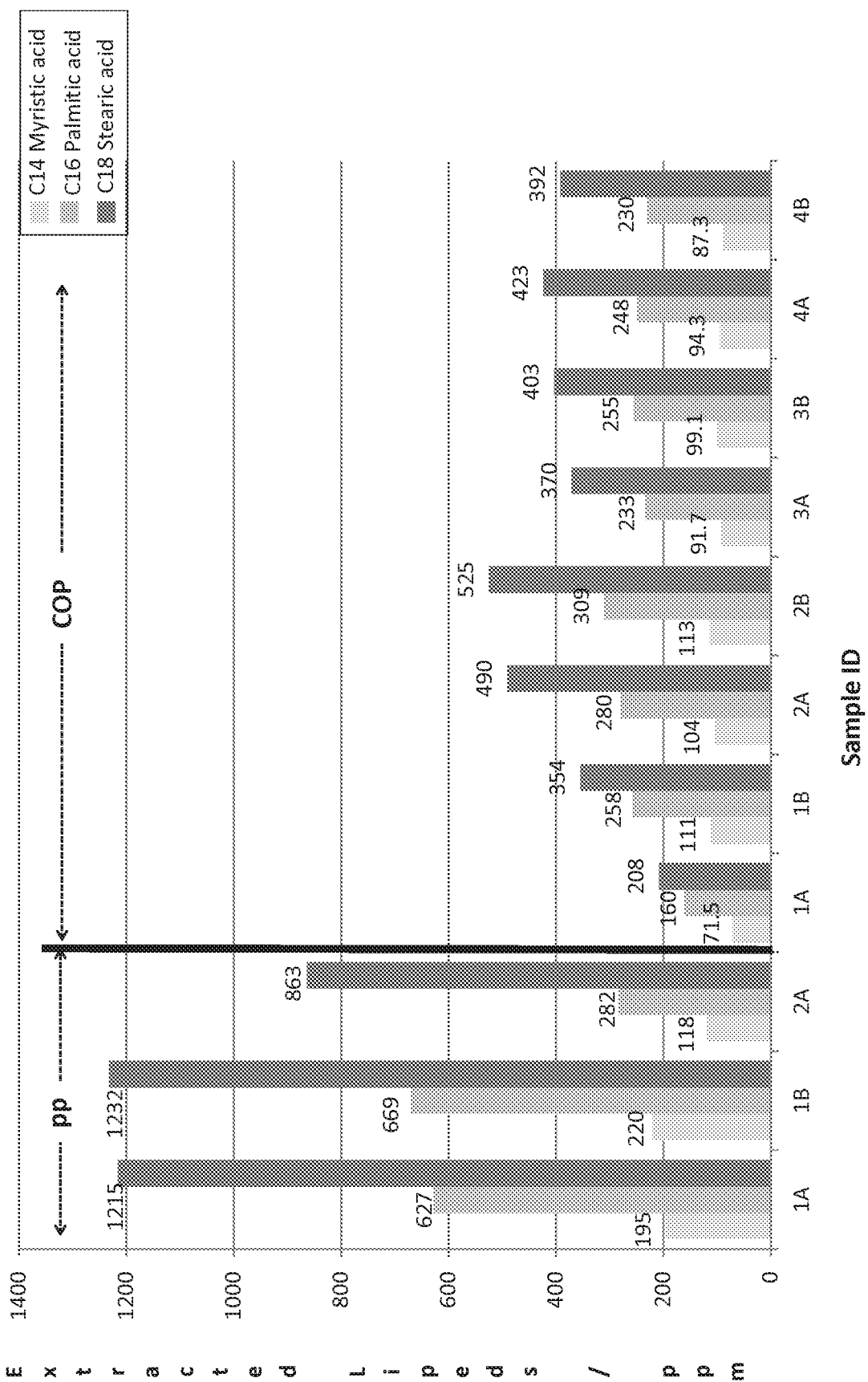
FIG. 8A is a chart showing the actual amounts of extracted fatty acids from polypropylene and cycloolefin polymer as measured according to the procedure described in Example 3.
Figure 8B:
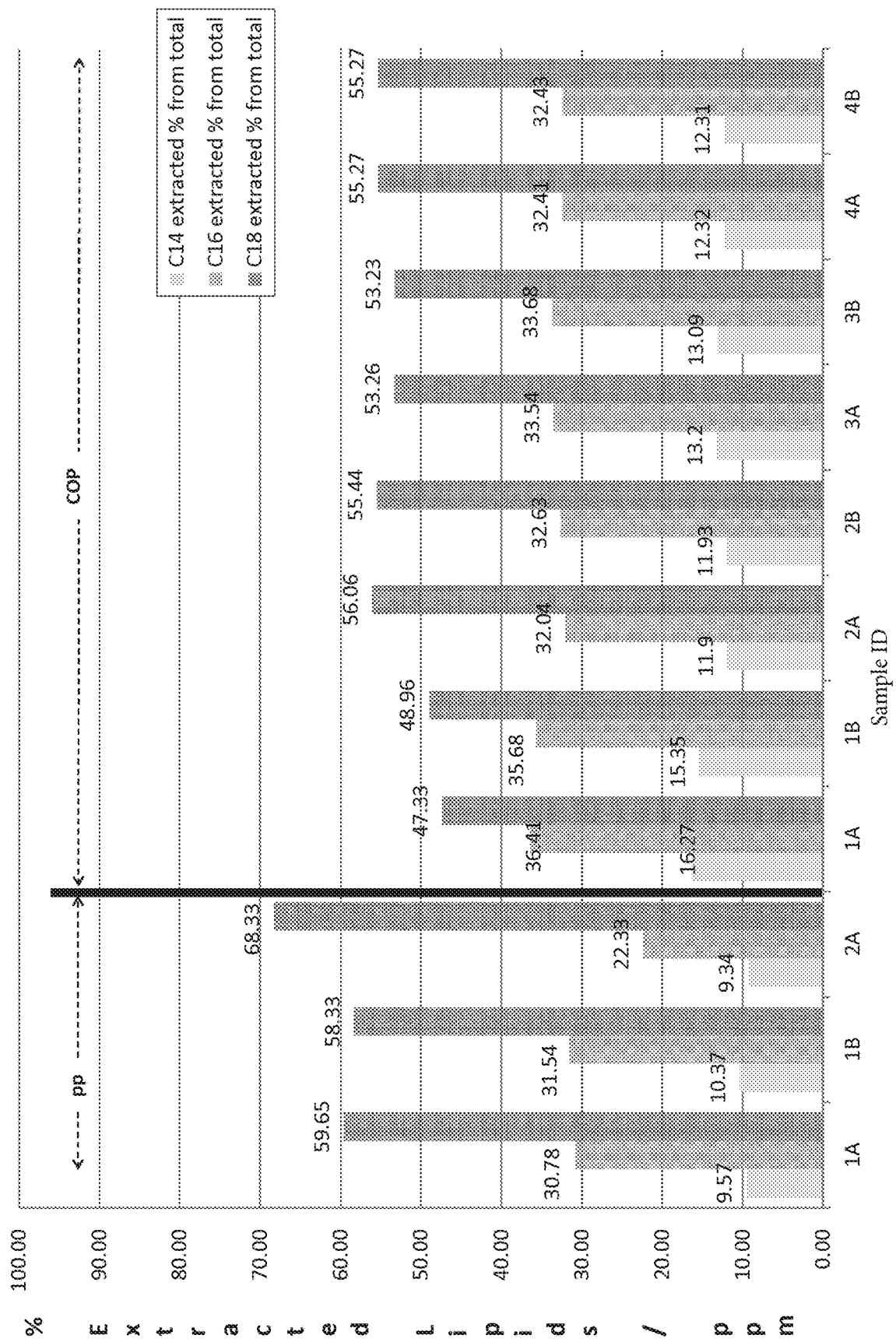
FIG. 8B is a chart showing the relative % amounts (C14:C16:C18) of extracted fatty acids from polypropylene and cycloolefin polymer as measured according to the procedure described in Example 3.

The results are shown in FIGS. 8A and 8B. FIG. 8A shows that in three out of four cases the amount of fatty acid extracted from polypropylene is at least threefold more than from the cycloolefin polymer. For the Sample IDs and 1A 1B for PP the relative values appear to be in close agreement with the initial fatty acid ratio blended into the polymer.

The relative extracted amounts are more clearly seen if the same data is presented in another format (see FIG. 8B) as the amount of C14, C16 and C18 extracted expressed as a percentage of the total amount extracted—thus allowing the relative affinities of each molecular weight to the polymer bulk to be more accurately ascertained. FIG. 8B shows that the ratio for extraction from polypropylene to be close to 1:3:6 and arguably more of the lowest molecular weight C14 is extractable from the cycloolefin polymer with a corresponding decrease in the amount of extractable C18 fatty acid.

Example 4—Generation of Hydrophobic Metal Surfaces as a Function of Fatty Acid Concentration in Various Cycloolefin Polymers and Copolymers The fatty acid palmitic (C16) and stearic (018) acid was incorporated into three types of cycloolefins, namely Zeonor 1060R—cycloolefin polymer from Zeon Corporation Topas 6013M-07 ("Topas 6013")—cycloolefin copolymer from Topas Advanced Polymers Topas 6017S-04 ("Topas 6017")—cycloolefin copolymer from Topas Advanced Polymers The level of incorporation of the 016/018 acids (1:1 mixture by weight) is depicted in Table 3. The resultant water contact angles of the subsequent stainless steel coated parts (50 nm metal coating thickness) after 80° C. for 8 hours conditioning in a sealed box—one box per test to isolate the effect of each polymer with the fatty acid combination—were measured.

TABLE 3

| Test | Polymer | Level of C16 Addition (parts by weight) |
|---|---|---|
| Reference | Zeonor 1060R | Nil |
| 1a | Zeonor 1060R | 0.30% |
| 1b | Zeonor 1060R | 1.0% |
| 1c | Zeonor 1060R | 5.0% |
| 1d | Zeonor 1060R | 20.0% |
| 2b | Topas 6013 | 1.0% |
| 2c | Topas 6013 | 5.0% |
| 2c - repeat | Topas 6013 | 5.0% |
| 3b | Topas 6017 | 1.0% |
| 3c | Topas 6017 | 5.0% |

Figure 9:
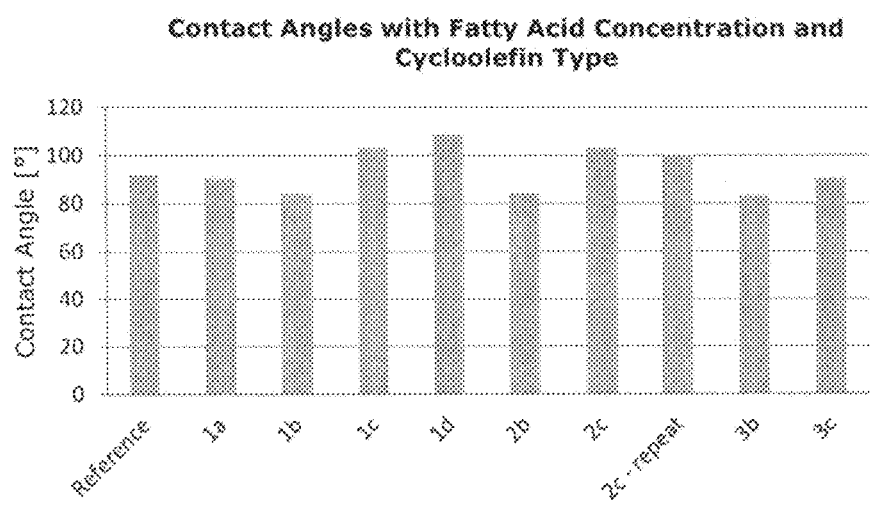
FIG. 9 is a graph showing the water contact angle (2 μl) of various cycloolefin polymers incorporating the fatty acid mixture according to Example 4.

The results are shown in FIG. 9. In each case, the water contact angle (2 µl) was measured with a Kruss Goniometer.

These results substantiate the conclusions from Example 3 regarding the fatty acid extraction values for cycloolefin. The fatty acids are much more difficult to vaporise from the cycloolefin polymer and a level of at least 5% weight on polymer bulk is required to yield a hydrophobic metal coated surface comparable to the PP/stainless steel surface described in Example 1. This level is much higher than the 0.15%-0.50% required to yield an equivalent contact angle under identical conditions when polypropylene is used as the polymer bulk.

From the measurements it is immediately evident that a larger amount (measured in parts per million) of the small molecule is extracted from the polypropylene than the cycloolefin polymer using an identical incorporation level and extraction technique. This is particularly surprising considering the fact the polypropylene is more resistant and swells less than cycloolefin in the non-polar hydrocarbon solvents used to extract the small molecule. Without wishing to be bound by theory, it appears that the reason for the easier extraction of the small molecule from the polypropylene matrix is due to the lack of affinity between the small molecule and its encapsulating polymer matrix.

Considering contributory physical factors, the polypropylene used is semi-crystalline, whereas the cycloolefin polymer is amorphous. The more crystalline nature of polypropylene is due to its tacticity (both isotactic and syndiotactic polypropylene are semi-crystalline). This means, in simple terms, that the interaction and proximity between the polypropylene polymer chains are strong and dense, forming a tight, relatively impenetrable network—accounting for polypropylene's excellent solvent resistance and lack of compatibility with other polymers (see A. Pegoretti et al, *Polymer* 44 (2003) 3381-3387). Conversely, the cycloolefin has bulky norbornene side-groups on its polymer backbone leading to an amorphous characteristic. It has higher clarity than polypropylene and also lesser resistance to hydrocarbon solvents. Because of its amorphous nature there is less interaction between the polymer chains than in polypropylene and the polymer is much more readily "plasticised" by small molecules, especially if the small molecule comprises of linear, non-bulky alkyl groups. In other words, the interaction between the small molecule and the encapsulating polymer matrix for the cycloolefin polymer is stronger than for the respective polypropylene example. Therefore it is more difficult to extract the small molecule from cycloolefin and the degree of extraction mainly depends on the small molecule's concentration—a theoretical "saturation point" later.

Example 5—MALDI Application Testing—Lipids in Polypropylene Polymer Bulk

The aim of these application tests was to define suitability of the polymer parts for MALDI mass spectrometry—the intended end use.

Experimental Procedures

The polymer material used to make the coated parts was carbon black filled polypropylene with an addition of 500 ppm of the antioxidant tris(2,4-di-tert-butylphenyl)-phosphite (Irgafos®168)—the concentrations of the carbon black and antioxidant being kept constant throughout the tests. To this "base" compound lipid mixture compositions were blended in on a weight for weight basis. The formulae of the final polymer compounds are shown in Table 4. The details of the polymer compositions and processing steps are described below.

The lipids used were myristic acid (C14), palmitic acid (C16), stearic acid (C18) and sodium stearate (C18-Na), all lipids being sourced from Sigma Aldrich. To produce the "Lipidmix" referred to below, the myristic acid, palmitic acid and stearic acid were blended together in a 1:6:13 by weight ratio before compounding with the polypropylene/carbon black/antioxidant composition.

Figure 10:
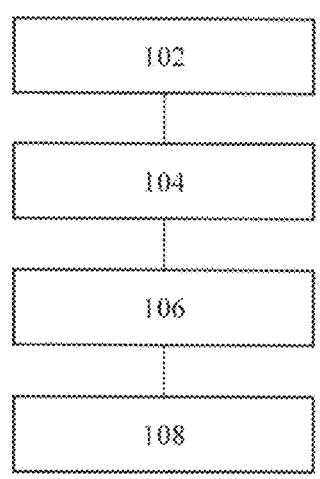
FIG. 10 illustrates the process workflow of Example 5.

The process workflow to make the MALDI targets for application testing involved the steps illustrated in FIG. 10. Initial step 102 comprises injection moulding the compounded polymer materials to MALDI target format with 500 nm deep reservoirs. Subsequent coating step 104 comprises coating the moulded parts with 100 nm stainless steel by vapour deposition. Following this step, conditioning step 106 comprises conditioning the coated parts at 80° C. for 1 to 24 hours in sealed box according to the conditioning arrangement explained in more detail below. Finally, in application testing step 108, the contact angle, adhesion tests and suitability for MALDI matrix spotting are tested.

Figure 11:
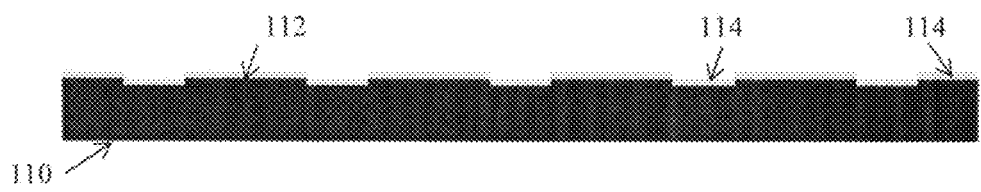
FIG. 11 is a schematic of functional MALDI target and conditioning arrangement of Example 5.

FIG. 11 is a schematic of the functional MALDI target and conditioning arrangement. The polymer base 110 is a carbon black filled polypropylene and additives, 1 mm thick. It has a 100 nm thick stainless steel top coating 112 having 500 nm deep wells 114 used for matrix spotting.

Figure 12:
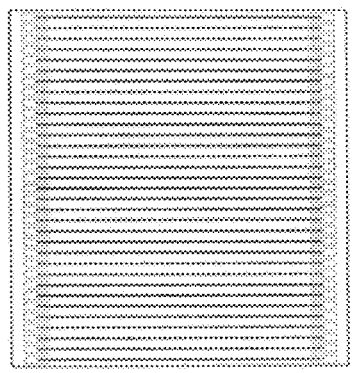
FIG. 12 illustrates the MALDI target arrangement in the sealed box for high temperature conditioning carried out in Example 5.

The MALDI target arrangement in the sealed box for high temperature conditioning is shown in FIG. 12. It comprises 25 targets per box, all targets facing the same direction. One box was produced for each polymer composition and conditioning time at 80° C. A total of 5 conditioning times were tested—1, 4, 8, 16 and 24 hours—for each polymer composition.

TABLE 4

| Polymer Compound ID | Polymer Composition |
| --- | --- |
| AAA | PP + 30% CB2 + 500 ppm Irgafos 168 |
| AAA1 | PP + 30% CB2 + 500 ppm Irgafos 168 + 0.15% Lipidmix |
| AAA2 | PP + 30% CB2 + 500 ppm Irgafos 168 + 0.30% Lipidmix |
| AAA3 | PP + 30% CB2 + 500 ppm Irgafos 168 + 0.50% Lipidmix |
| AAAB2 | PP + 30% CB2 + 500 ppm Irgafos 168 + 0.30% C16/C18 acid |
| AAAC2 | PP + 30% CB2 + 500 ppm Irgafos 168 + 0.30% C18-Na |

Key: PP = Polypropylene (HK060AE ex Borealis);
CB2 = Carbon black Elftex P100 ex. Cabot Corporation;
Irgafos 168 = tris(2,4-di-tert-butylphenyl)phosphite (antioxidant ex. BASF)
Lipidmix = 1:6:13 pbw C14:C16:C18 fatty acids;
C16/C18 acid = 1:1 pbw C16:C18 fatty acids;
C18-Na = C18 sodium stearate.

All percentages are expressed as pbw (parts by weight).

The polymer parts were conditioned for a time of 1 hour, 4 hours, 8 hours, 16 hours or 24 hours at a constant temperature of 80° C.

Application Test Results

Adhesion Tests

After all targets had been conditioned, a sample of each polymer composition/conditioning time was tested for adhesion to quantify the adherence of the stainless steel coating to the molded part. It could be argued that the migration of small molecules to the metal coating/polymer interface could be potentially degrading to the adhesion at this interface. A simple tape test—uniformly applying Scotch® 610 to the metal surface, ensuring a good lamination of the tape completely void of air bubbles by rubbing the tape with a soft implement, and removing the tape sharply at a 180° angle—provided a gauge whether the adhesion of the metal coating had been affected by the incorporation of lipids in the polymer bulk. The results are shown in Table 5 below.

TABLE 5

| | Conditioning Time [hours] | | | | |
| --- | --- | --- | --- | --- | --- |
| | 1 | 4 | 8 | 16 | 24 |
| AAA | NG | NG | <OK | <OK | <OK |
| AAA1 | <OK | <OK | <OK | <OK | <OK |
| AAA2 | <OK | <OK | <OK | NG | NG |
| AAA3 | NG | NG | NG | NG | NG |
| AAAB2 | OK | OK | <OK | OK | OK |
| AAAC2 | OK | <OK | <OK | OK | <OK |

Key: NG = >10% metal removal by tape;
<OK = 1-10% metal removal by tape,
OK = no metal removal by tape (Tested according to guidelines in standard test method ISO 2409:2007)

From Table 5 it is clearly demonstrated that the lipid can affect the metal adhesion. This is most clearly seen by comparing the results of the AAA (no lipid reference) with AAA3 (Lipidmix incorporated at 0.50%). The AAA3 failed the adhesion test at all conditioning times. However also demonstrated that for a certain polymer composition and proper selection of the lipids a formulation is possible which shows at least comparable adhesion to a non-lipid containing reference. In fact, compositions AAAB2 and AAAC2 perform slightly better in the adhesion tests than the reference.

Contact Angle

Figure 13A:
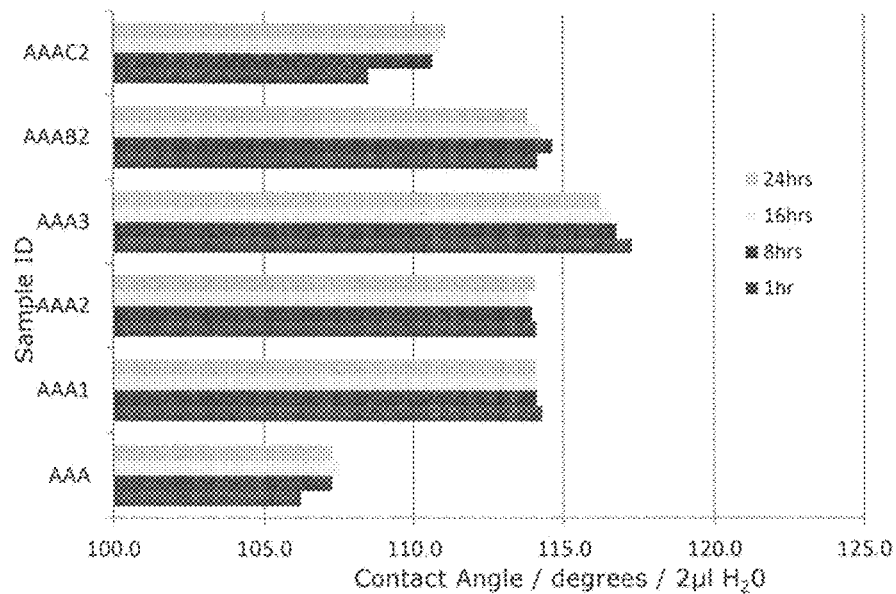
FIG. 13A is a chart illustrating the contact angles for polymer compounds with reference to their conditioning time at 80° C. according to Example 5.
Figure 13B:
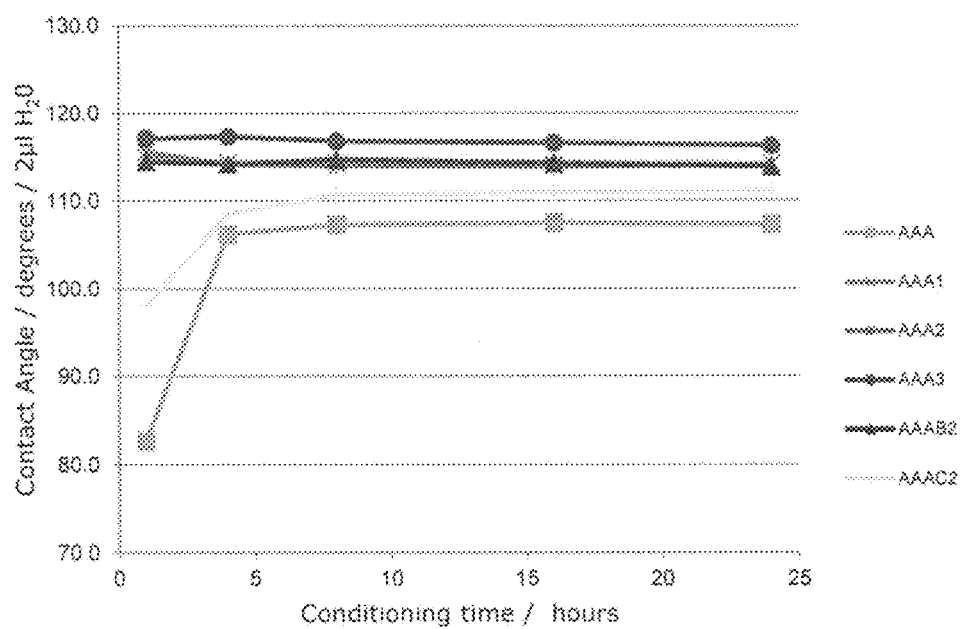
FIG. 13B is a graph illustrating the contact angles for polymer compounds with reference to their conditioning time at 80° C. according to Example 5.

The contact angles were measured with a Kruss Goniometer, using a 2 μl water drop. The results of the contact angle tests are shown in FIGS. 13A and 13B. As these Figures illustrate, the polymer compounds AAA1, AAA2 and AAAB2 yielded a reliable water contact angle between 110-115°. Compound AAA3, the compound with the highest tested Lipidmix concentration, yielded the highest contact angle—recorded at 115-120°. The reference sample, no lipidmix added during compounding, displayed the lowest contact angle of just over 105°. The compound containing the C18 salt was comparatively ineffective, reaching a contact angle slightly greater than 110°. Interesting is the conditioning time taken for each compound to reach a stable hydrophobic contact angle—these results are shown more clearly in FIG. 13B.

Unlike FIG. 13B, FIG. 13A clearly shows that the conditioning time at 80° C. necessary to yield the maximum contact angle is longer for the compound containing the C18 salt than all other compounds. This is believed to be due to the bulky sodium ester end-group limiting migration from within the polymer bulk to the metal-coated surface.

MALDI Matrix Spotting

The metal-coated MALDI targets produced with the test compounds were subjected to application testing. Application testing involved judgement in terms of receptivity (spot homogeneity and geometry) to a spotted MALDI matrix mixed with bacteria. The MALDI matrix used is CHCA (----) and is commercially available as Vitek MS-CHCA from BioMérieux, article number 411071. Prior to spotting, an E. coli suspension is thoroughly mixed with the matrix in the ratio of 49 µl of matrix to 1 µl of the E. coli suspension. The e-coli suspension is commercially available from Takara Clontech, article number 9027. To perform the application tests 1 µl of the mixture is spotted using an Eppendorf Biomaster pipette and allowed to dry under ambient conditions for 4-5 minutes. The judgement criteria for the dry matrix mixture is shown and explained in Table 6 below.

TABLE 6

Application Tests: Matrix Spotting

| | Spot judgement | Spot geometry |
|---|---|---|
| OK | Homogeneous spots, no spreading, cracks or scratches | Diameters (a, b) between 1.5 and 2.5 mm and Diameter ratio (a/b) between 0.9 and 1.1 |
| Fail | Inhomogeneous spots, spreading outside well, cracks and/or scratches | Diameters (a, b) less than 1.5 or higher than 2.5 mm or Diameter ratio (a/b) less than 0.9 and higher than 1.1 |

The spot judgment criteria are illustrated in FIGS. 17A through 17D, as follows:

FIG. 14A: OK—homogeneous; FIG. 14B: Fail—inhomogeneous

FIG. 14O: Fail—cracks; FIG. 14D: Fail—spreading

The spot geometry is illustrated in FIG. 15, Table 6 indicating the "a" and "b" pass/fail specifications.

Table 7 shows the spot judgment results for the visual, microscope inspection of the dried matrix/E. coli mixture in the wells of the MALDI target.

TABLE 7

| Com- | Conditioning Time (hours) | | | | |
|---|---|---|---|---|---|
| pound | 1 | 4 | 8 | 16 | 24 |
| AAA | Spreading | Spreading | Spreading | Spreading | Spreading |
| AAAA1 | Spreading/ Inhomogeneous | OK | OK | OK | OK |
| AAAA2 | Spreading/ Inhomogeneous | OK | OK | OK | OK |
| AAAA3 | Spreading/ Inhomogeneous | OK | Cracks/Inhomogeneous | | |
| AAAB2 | Spreading/ Inhomogeneous | OK | OK | OK | OK |
| AAAC2 | Spreading | Spreading | Spreading | Spreading | Cracks |

Table 7 shows that the targets moulded from compounds AAA (reference, no lipidmix) and AAAC2 (C18 salt) failed the spot judgement regardless of conditioning time. All other compounds except for the AAA3 afforded an acceptable result as long as the conditioning time exceeded 1 hour. For the compound AAA3 (highest lipidmix concentration at 0.50%), 4 hours appears to be the only acceptable conditioning time and for the most part the compound yielded an inhomogeneous matrix spot with cracks. In summary, it is evident that the lipidmix, or the equally effective mixture of C16 and C18 fatty acids, are able to promote controllable and homogeneous formation of a MALDI matrix precombined with a bioanalyte—in this case HCCA combined with the bacteria E. coli.

This finding is further illustrated by the spot geometries set out in Table 8 below which quantifies the amount of spreading (all values are in mm) in the confined well area of 2.5 mm. The samples which failed due to spreading outside the well are noted (*) in Table 8.

TABLE 8

| | Conditioning Time (hours) | | | | |
|---|---|---|---|---|---|
| Compound | 1 | 4 | 8 | 16 | 24 |
| AAA * | a = 2.49 * | a = 2.75 * | a = 2.65 * | a = 2.65 * | a = 2.67 * |
| | b = 2.53 | b = 2.60 | b = 2.59 | b = 2.60 | b = 2.60 |
| | a/b = 0.98 | a/b = 1.06 | a/b = 1.02 | a/b = 1.02 | a/b = 1.03 |
| AAAA1 | a = 2.65 * | a = 2.35 | a = 2.39 | a = 2.44 | a = 2.49 |
| | b = 2.60 | b = 2.21 | b = 2.28 | b = 2.42 | b = 2.37 |
| | a/b = 1.02 | a/b = 1.06 | a/b = 1.05 | a/b = 1.01 | a/b = 1.05 |
| AAAA2 | a = 2.65 * | a = 2.35 | a = 2.39 | a = 2.44 | a = 2.39 |
| | b = 2.38 | b = 2.21 | b = 2.35 | b = 2.42 | b = 2.27 |
| | a/b = 1.11 | a/b = 1.06 | a/b = 1.02 | a/b = 1.01 | a/b = 1.05 |
| AAAA3 | a = 2.59 * | a = 2.44 | a = 2.37 | a = 2.36 | a = 2.31 |
| | b = 2.25 | b = 2.29 | b = 2.41 | b = 2.19 | b = 2.21 |
| | a/b = 1.15 | a/b = 1.07 | a/b = 0.98 | a/b = 1.08 | a/b = 1.05 |
| AAAB2 | a = 2.67 * | a = 2.42 | a = 2.38 | a = 2.40 | a = 2.46 |
| | b = 2.55 | b = 2.32 | b = 2.31 | b = 2.33 | b = 2.30 |
| | a/b = 1.05 | a/b = 1.04 | a/b = 1.03 | a/b = 1.03 | a/b = 1.07 |

TABLE 8-continued

| | Conditioning Time (hours) | | | | |
|---|---|---|---|---|---|
| Compound | 1 | 4 | 8 | 16 | 24 |
| AAAC2 | a = 2.72 *<br>b = 2.41<br>a/b = 1.13 | a = 2.66 *<br>b = 2.47<br>a/b = 1.08 | a = 2.58 *<br>b = 2.42<br>a/b = 1.047 | a = 2.64 *<br>b = 2.47<br>a/b = 1.07 | a = 2.48<br>b = 2.37<br>a/b = 1.05 |

Example 6—Effect of Slide Quantity and Proximity on Water Contact Angle from Box Conditioning The objective of this test was to provide evidence for the mechanism of creating hydrophobic contact angles with stainless steel coated polymer slides whist oven conditioning where the polymer contains a lipid mixture in its bulk. The metal coated polymer slides were arranged in various configurations in a box containing slide holding inserts. Additionally the backside of the slides were either sealed or left exposed before temperature conditioning. With this variety of configurations it would be able to determine the extent of lipid migration from the back of one slide to the face side of its nearest neighbour. Conceivably, the extent of migration would be influenced by the ease of lipid transport from one slide to the next, namely whether the backside of the slide was sealed or not and also depending on the distance of one slide to the next.

Figure 16A:
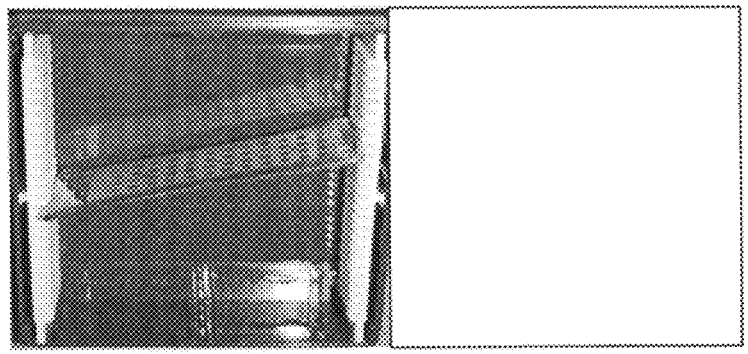
FIGS. 16A through 16E illustrate the box configurations described in Example 6.
Figure 16B:
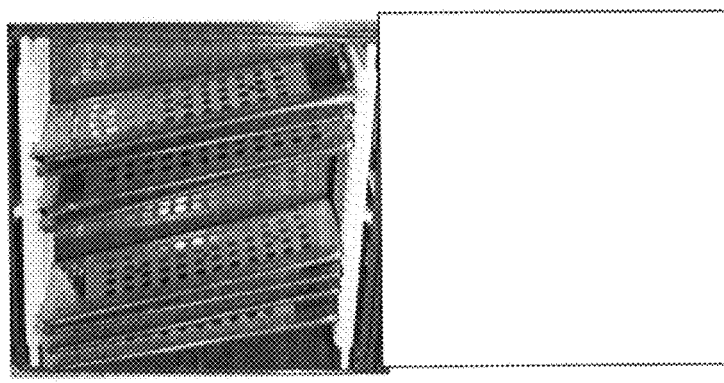
Figure 16C:
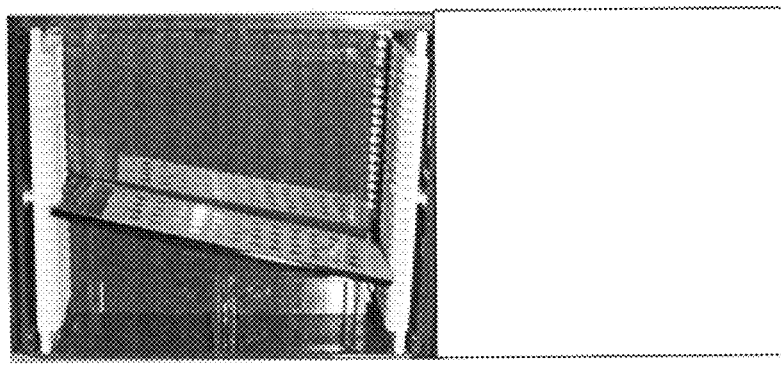
Figure 16D:
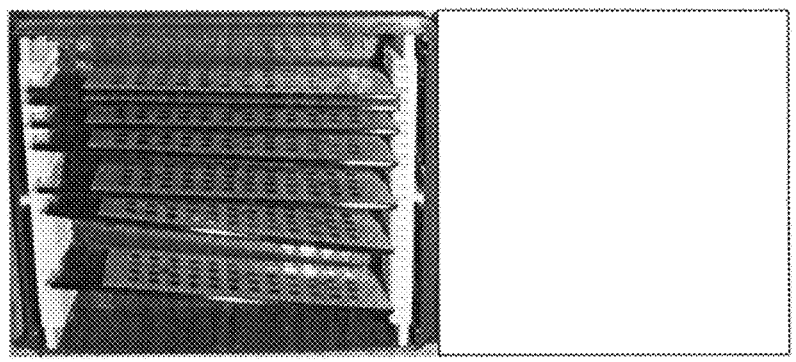
Figure 16E:
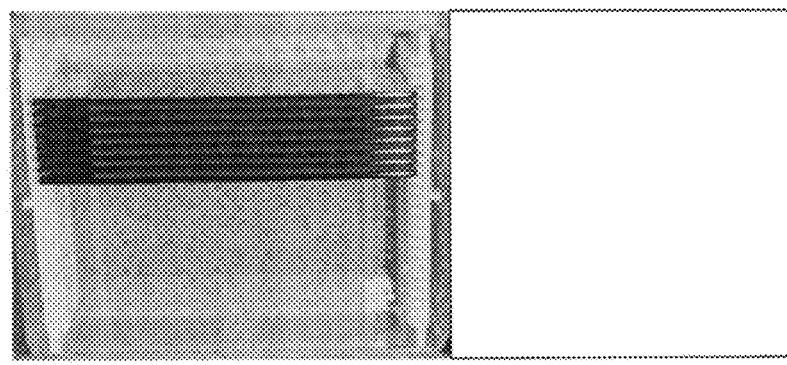

The polymer used in this example corresponded to Compound AAA2 used in Example 5, the "Lipidmix" being the same as that used in Example 5. The polymers were coated with stainless steel at a thickness of 100 nm by physical vapor deposition and arranged in five boxes in the configurations shown in FIGS. 16A (Box 1) through 16E (Box 5). Some slides were sealed on the backside with self-adhesive polyester tape, the number and designation of the sealed slides is shown in the schematic below. All boxes were sealed with a tightly fitting lid before placing in a convection oven at 80° C. for a period of 8 hours.

Figure 17A:
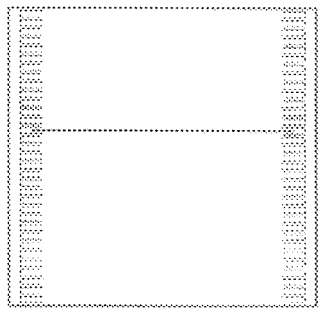
FIGS. 17A through 17D illustrate the schematics of slide arrangement in the boxes used in the texts of Example 6.
Figure 17B:
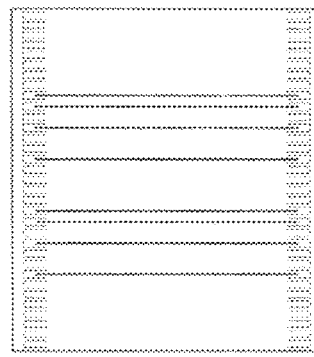
Figure 17C:
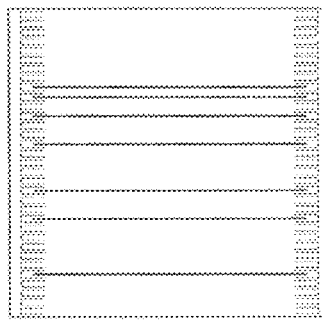
Figure 17D:
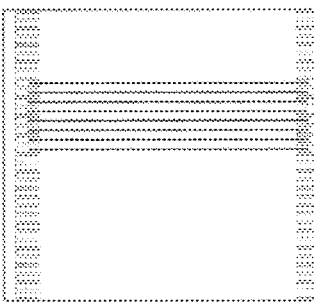

The schematics of slide arrangement in each box are shown in FIGS. 17A through 17D. As shown in FIG. 17A, Boxes 1 and 3 contain a single slide per sealed box. In Box 1, the backside of a single slide is sealed with PET self-adhesive tape. In Box 3 the single slide is stored as is, unsealed. As shown in FIG. 17B, Box 2 is an eight slide box, in which the top 4 slides (A-D) are unsealed and the bottom 4 (E-H) sealed. As shown in FIG. 17C, Box 4 is a seven slide box, in which all slides were stored as is, unsealed. Finally, as shown in FIG. 17D, Box 5 is an eight slide box in which all slides were stored as is, unsealed and closely stacked. In all cases the front side is the metal-coated side and faces up, and the back side—the polymer side—faces down.

FIG. 18 is a schematic of the slide used in this Example. The polymer base 120 is a carbon black filled polypropylene containing 0.3% of the lipid mix and has a 100 nm thick stainless steel top coating 122.

After heating at 80° C. for 8 hours as described above, the water contact angles of the metallised surfaces measured at room temperature with a Kruss Goniometer using a 2 µl water drop. The results are shown in FIG. 19.

Figure 19:
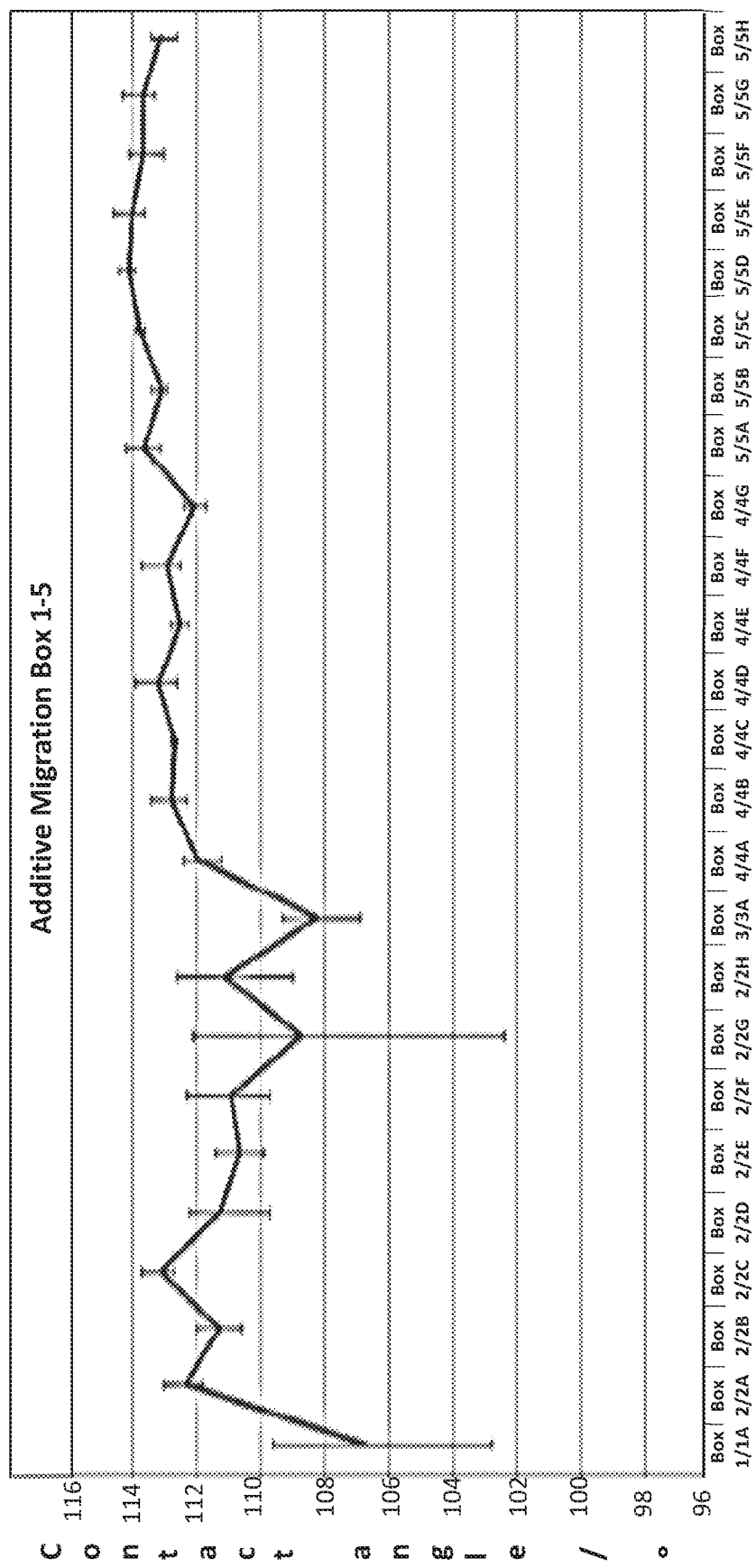
FIG. 19 illustrates the water contact angle of metal surface depending on the slide/box configuration of the tested polymer parts in Example 6.

FIG. 19 illustrates a clear trend towards a higher and more stable hydrophobic contact angle, directly explicable by a closer orientation from slide-to-slide and a freer "passage" for lipid vapour diffusion from the back of one slide (lipid in polymer bulk) to the metal-coated front side of its nearest neighbour. Of additional note, slide 1A, single slide in a box with the polymer side sealed, displays the lowest contact angle of all slides in the test series. It is proposed that this is due to the hindered fatty acid migration from its polymer bulk and no possibility of receiving fatty acid from other slides in the same box. Slide 3A shows the second lowest contact angle: this slide is the direct analogue of slide 1A (i.e single slide in a box) however this time the back side of the slide is not sealed and able to diffuse lipid from an exposed polymer surface into the box environ. To further substantiate this observation it is notable that slide 2E, F, G and H (sealed slides in one half of box 2) all showed lower contact angles than their unsealed counterparts 2A, B, C, and D. More stable hydrophobic contact angles begin to become evident in Box 4, and even more so in Box 5—as the number of slides per box and their proximity increase. Of all slides in boxes 4 and 5 collectively, slides 4A and 4G display the lowest contact angles due to the lack of a metal-coating to polymer interfacial exposure.

Example 7—Effect of Oxidation on Gold Coated COP

The following polymer was used in this Example:
1. Cycloolefin polymer (COP) Zeonor 1060R supplied by Zeon Corporation.

A lipid mix was prepared constituting 5% myristic acid, 30% palmitic acid and 65% stearic acid by weight. The polymer was compounded to produce a polymer formulation incorporating 99.7% by weight of the polymer and 0.30% by weight of the lipid mix. The mixture contained no added carbon.

The polymer formulation was subjected to an injection moulding process. The thickness of the moulded part was 1.6 mm. A standard microscope slide format with 6 wells (recesses) 3 µme deep was made using a Netstal injection moulding machine; 150 moulded parts were prepared in total.

The moulded parts were coated by physical vapour deposition with gold at 50 nm coating thickness.

Apart from the reference samples, the coated, moulded parts were to five different oxidation pretreatments. These were
  Dilute acid washing with 0.2M aqueous sulfamic acid, $NH_2SO_3H$ (aq)
  Submersion for 15 seconds in a 0.2M potassium permanganate aqueous solution, $KMnO_4$ (aq)
  Dilute acid washing. $NH_2SO_3H$ (aq), followed by submersion in $KMnO_4$ (aq)
  30 seconds $O_2$ plasma treatment
  60 seconds $O_2$ plasma treatment Immediately after the oxidative pretreatment all samples, including the reference samples, were subjected to heat conditioning at 80° C. in a sealed box, 25 parts per box, 1 box for each pretreatment type plus the reference (no pretreatment) for 8 hours at 80° C. After conditioning, the contact angle with 2 µl water was measured with a Krüss Goniometer available from Krüss Optronics at specific standardized measurement points on the samples slides—3 pieces per condition and 5 measurement points per piece were measured and an average taken of all 15 measurements. The results obtained are set out in Table 9 below. An overall graphical interpretation of the chemically pretreated gold slides after pretreatment and after conditioning can also be found in FIG. 20.

TABLE 9

| Oxidation Condition | Average initial contact angle after coating | Average contact angle after pretreatment | Conditioning (8 hrs at 80° C.) | Average final contact angle |
|---|---|---|---|---|
| None (reference) | 84.4° | n/a | yes | 87.8° |
| KMnO$_4$ (aq) | 84.6° | 37.2° | yes | 104.6° |
| Acid washing | 85.8° | 75.6° | yes | 76.3° |
| Acid washing + KMnO$_4$ (aq) | 83.2° | 62.9° | yes | 98.9° |
| 30 s O$_2$ plasma | 82.4° | 21.7° | yes | 109.2° |
| 60 s O$_2$ plasma | 85.4° | 22.8° | yes | 106.4° |

Figure 20:
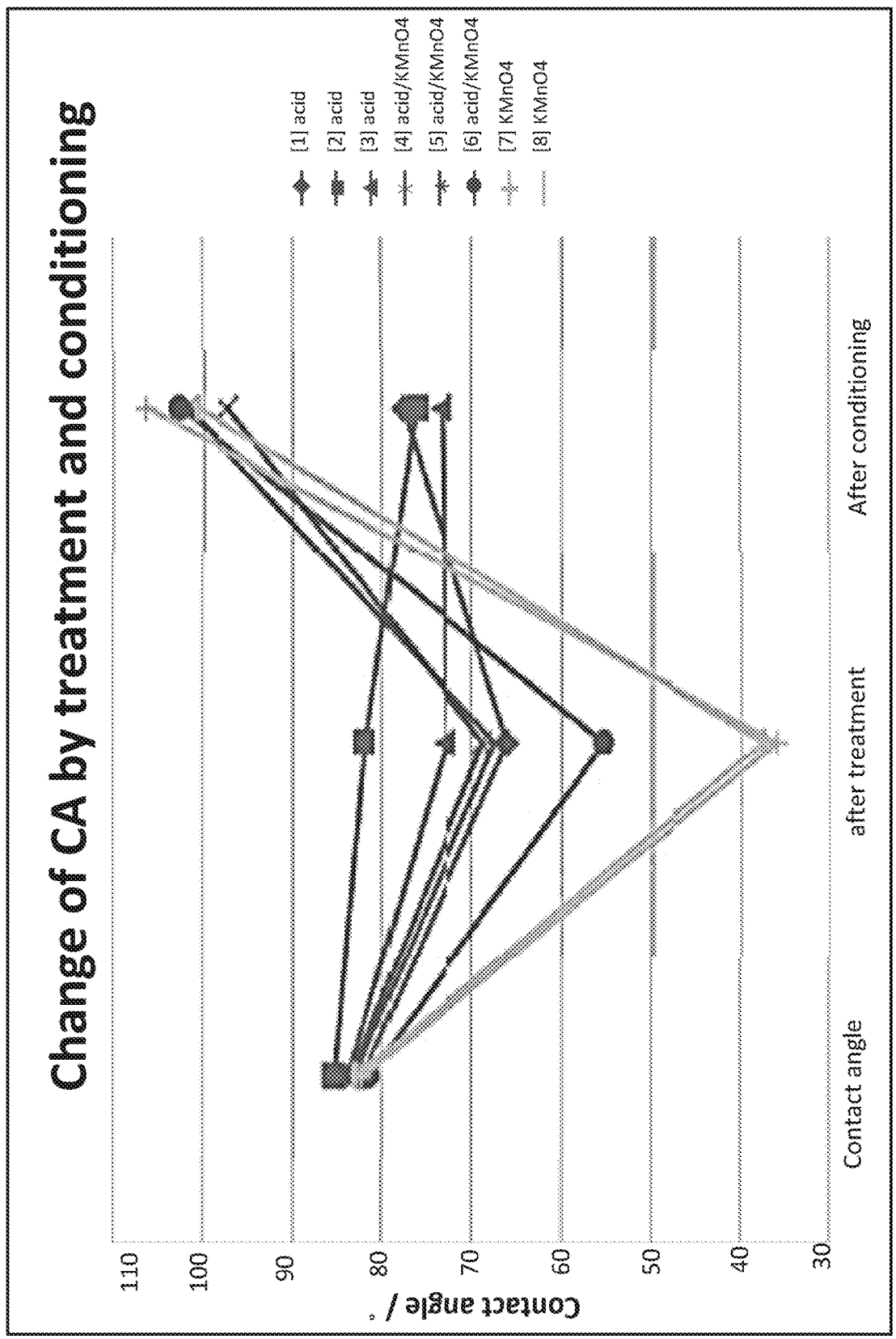
FIG. 20 is a graph illustrating the changes in contact angle of a gold-coated cycloolefin polymer Zeonor 1060R before and after conditioning according to Example 7.
Figure 21:
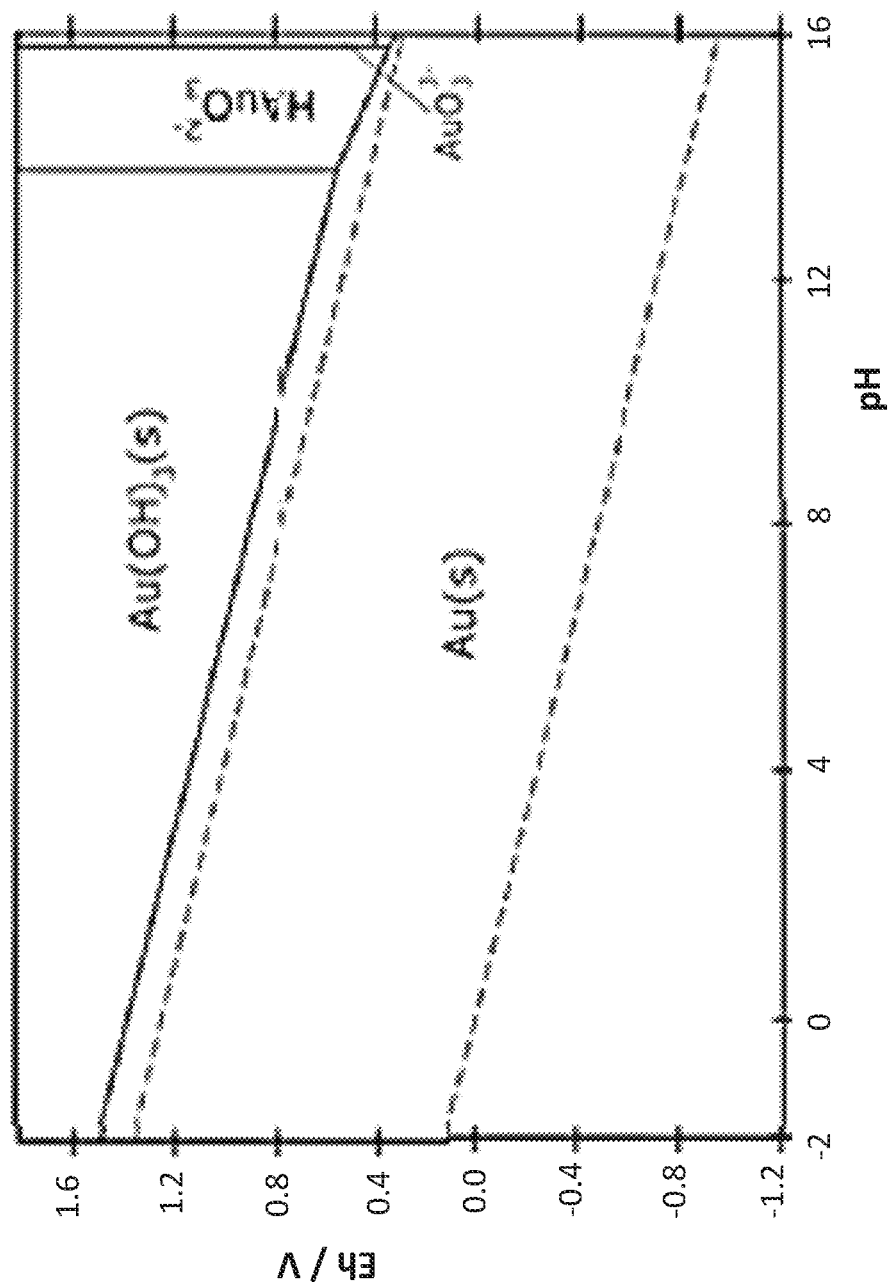
FIG. 21 is a redox phase diagram showing the various oxidation states of gold as a function of PH.

Table 9 and FIG. 20 clearly demonstrate that although the immediate effect of the pretreatment is to lower the average contact angle compared to the initial value after coating, the overall effect is to raise the contact angle after conditioning; the highest final contact angle after conditioning being afforded by the 60 second oxygen plasma pretreatment. An explanation to this effect is provided in FIG. 21—the Pourbaix diagram for gold. The oxidation of gold to gold trihydroxide creates chemical grafting moieties on the surface of what would otherwise be an inert surface.

Example 8—Direct Crystallisation of MALDI Matrix on Gold Coated COP

Figure 22A:
FIGS. 22A through 22I illustrate the direct crystallisation of 3-hydroxypicolinic acid deposited from a water/acetonitrile solute on hydrophobic gold.
Figure 22B:
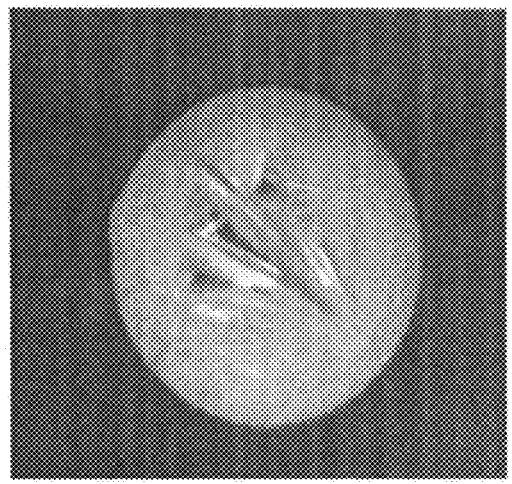
Figure 22C:
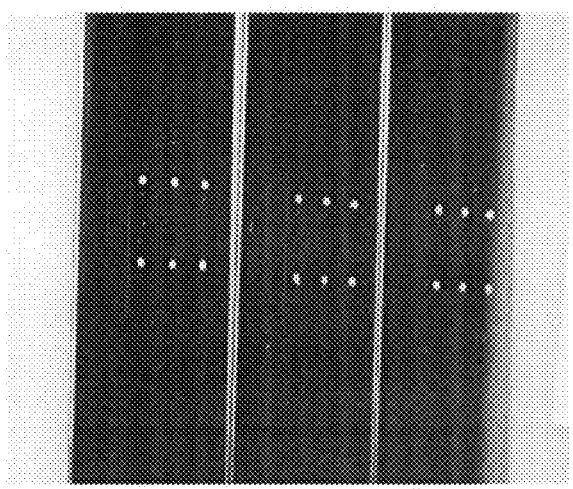
Figure 22D:
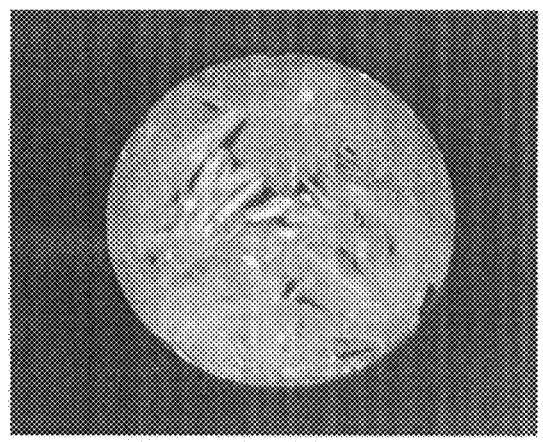
Figure 22E:
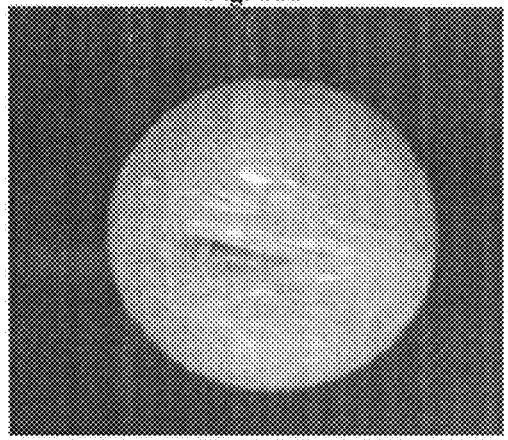
Figure 22F:
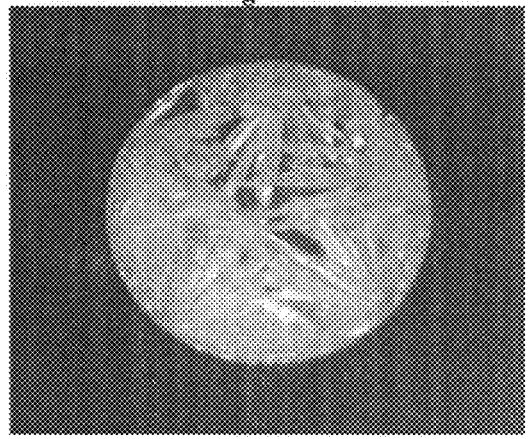
Figure 22G:
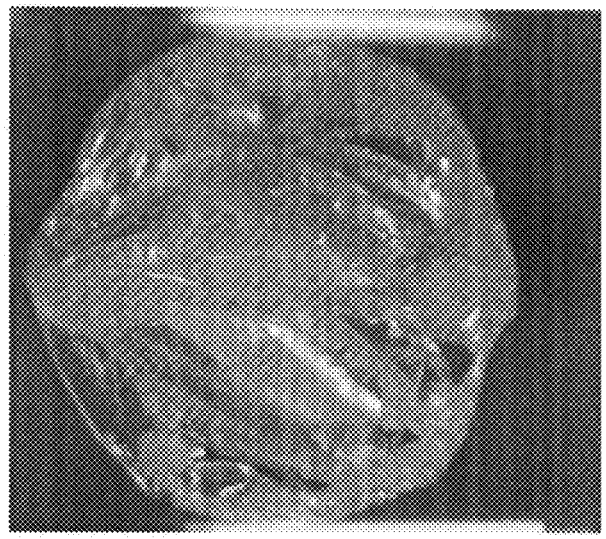
Figure 22H:
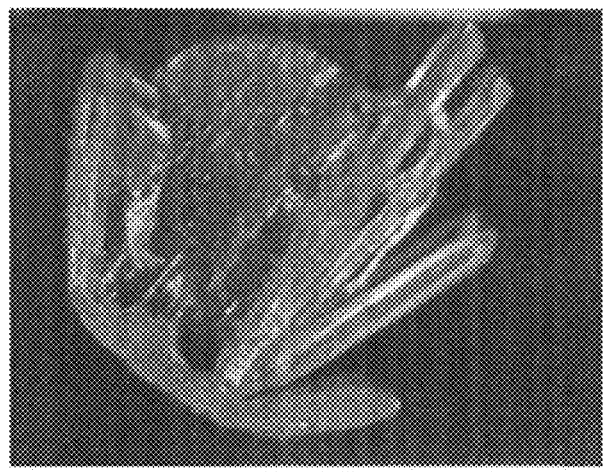
Figure 22I:
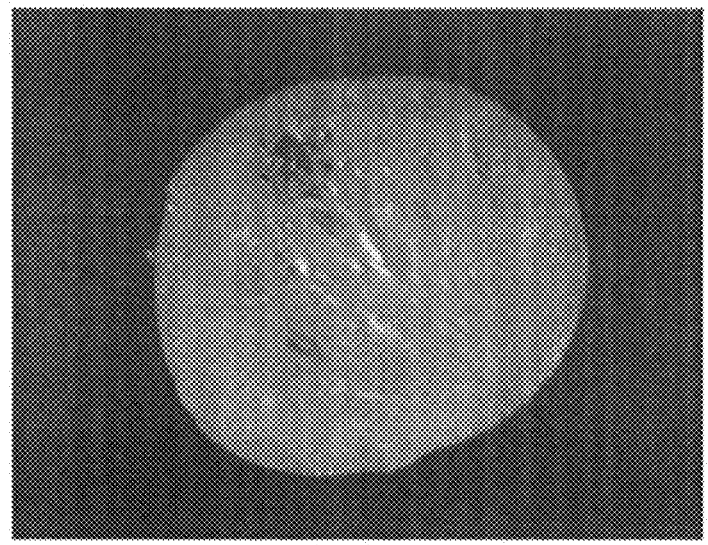

The reference samples and those pretreated with 60 seconds oxygen plasma described in Example 7 were spotted with a solution of 3-hydroxypicolinic acid dissolved in water and acetonitrile, their respective average contact angles being 87.8° and 106.4° as shown in Table 9. The results can be found in FIGS. 22A-I. It is shown that the samples subjected to the pretreatment prior to conditioning exhibit acceptable crystallisation of the organic MALDI matrix substance (FIGS. 22A-F inclusive) whereas the reference samples, those not subjected failed to focus the matrix within a well-defined area and therefore deemed less suitable for MALDI mass spectrometry (FIGS. 22G-1).

CROSS-REFERENCE TO RELATED APPLICATIONS

The present application claims priority of EP patent application No. 13 164 010.4 filed on 16 Apr. 2013, the entire contents of which are incorporated herein by reference.

The invention claimed is:

1. A method of producing polymer slides comprising the following steps:
    (a) incorporating hydrophobic small molecules into polymer parts of a plurality of polymer slides before during or after manufacture of said polymer parts, each polymer part having a surface, said surface having a first surface portion and a second surface portion, the hydrophobic small molecules and the polymer being essentially inert to one another, wherein the molecular weight of the small molecules is between 100 and 500; and
    (b) arranging the plurality of polymer slides so that adjacent polymer slides are arranged in a manner that the first surface portion of one slide faces a second surface portion of another slide; and
    (c) annealing the polymer parts at 50 to 150° C. to induce migration of the hydrophobic small molecules to the surface of the polymer parts for obtaining surface portions having respective first and second specified degrees of hydrophobicity which are different from each other, wherein
said annealing exerts vapor pressure of the hydrophobic small molecule at the annealing temperature so that the hydrophobic small molecules evaporate from said first surface portion of the polymer part of one polymer slide onto the adjacent second surface portion of the polymer part of another polymer slide to provide the surface of an adjacent polymer part with a specified degree of hydrophobicity by vaporisation onto said second surface portion of the adjacent polymer part defined by the combination of the polymer and the hydrophobic small molecules.

2. A method according to claim 1, wherein the specified degree of hydrophobicity is further defined by a coating layer on said surface.

3. A method according to claim 2, wherein said surface has a first surface portion and a second surface portion which differ in their surface coating.

4. A method according to claim 1, wherein the polymer is an organic polymer.

5. A method according to claim 4, wherein the organic polymer is a polyolefin.

6. A method according to claim 5, wherein the polyolefin is polypropylene, a cycloolefin homopolymer or a cycloolefin copolymer.

7. A method according to claim 2, wherein the hydrophobic small molecule has a functional group capable of forming a chemical bond to a metal atom.

8. A method according to claim 1, wherein the small molecule is incorporated into polymer raw material used to form the polymer part.

9. A method according to claim 1, additionally including the following step subsequent to step (a) but prior to step (b):
    (a1) coating said second surface portion of the polymer parts of the polymer slides with a metal or a metallic compound.

10. A method according to claim 9, additionally comprising the step subsequent to step (a1) but prior to step (b):

(a2) oxidising the metal or metallic compound on said surface.

11. A method according to claim 1, additionally including the step of coating said surface of the polymer part with an insulator.

12. A method according to claim 9, additionally comprising the step subsequent to step (a1) but prior to step (b):
(a2) performing a plasma treatment of said surface of the polymer part.

13. A method according to claim 1, further comprising: re-annealing the polymer part at a subsequent time to return the surface to the specified degree of hydrophobicity.

* * * * *